United States Patent
Rogan et al.

(10) Patent No.: US 6,890,179 B2
(45) Date of Patent: May 10, 2005

(54) INTERACTIVE GAMES FOR TEACHING FINANCIAL PRINCIPLES

(75) Inventors: Philip Andrew Rogan, Bozeman, MT (US); David Andrew Gipp, Bozeman, MT (US)

(73) Assignee: Cashflow Technologies, Inc., Scottsdale, AZ (US)

( * ) Notice: Subject to any disclaimer, the term of this patent is extended or adjusted under 35 U.S.C. 154(b) by 0 days.

(21) Appl. No.: 10/267,249

(22) Filed: Oct. 8, 2002

(65) Prior Publication Data

US 2004/0067469 A1 Apr. 8, 2004

(51) Int. Cl.⁷ ............................................. G09B 19/18
(52) U.S. Cl. .......................... 434/107; 434/362; 705/1
(58) Field of Search ................... 434/107, 350, 434/362; 273/256; 705/1

(56) References Cited

U.S. PATENT DOCUMENTS

| | | | |
|---|---|---|---|
| 2,297,011 A | | 9/1942 | Mooney |
| 3,807,739 A | | 4/1974 | Henley et al. |
| 4,012,046 A | | 3/1977 | Liket |
| 4,109,918 A | | 8/1978 | Mele et al. |
| 4,279,422 A | | 7/1981 | Shaw |
| 4,378,942 A | | 4/1983 | Isaac |
| 4,522,407 A | | 6/1985 | Hatherley |
| 4,538,816 A | * | 9/1985 | Figueroa .................. 273/256 |
| 4,840,382 A | | 6/1989 | Rubin |
| 4,890,844 A | | 1/1990 | Weiss |
| 4,932,668 A | | 6/1990 | Stewart |
| 4,955,616 A | | 9/1990 | Ingalls |
| 5,056,792 A | | 10/1991 | Helweg-Larsen et al. |
| 5,071,135 A | | 12/1991 | Campbell |
| 5,139,269 A | | 8/1992 | Peterson |
| 5,318,447 A | | 6/1994 | Mooney |
| 5,429,373 A | | 7/1995 | Chelko et al. |
| 5,826,878 A | | 10/1998 | Kiyosaki et al. |
| 6,032,957 A | | 3/2000 | Kiyosaki et al. |
| 6,062,862 A | * | 5/2000 | Koskinen .................... 434/107 |
| 6,106,300 A | | 8/2000 | Kiyosaki et al. |
| 6,236,955 B1 | * | 5/2001 | Summers ....................... 703/6 |
| 6,375,466 B1 | * | 4/2002 | Juranovic ................... 434/107 |
| 6,408,263 B1 | * | 6/2002 | Summers ....................... 703/6 |
| 6,622,003 B1 | * | 9/2003 | Denious et al. ............. 434/350 |
| 6,729,884 B1 | * | 5/2004 | Kelton et al. ............... 434/236 |
| 6,767,210 B2 | * | 7/2004 | Joffe .......................... 434/107 |
| 2002/0091608 A1 | * | 7/2002 | Odegaard et al. ............. 705/36 |
| 2003/0162159 A1 | * | 8/2003 | Sheehan ..................... 434/362 |
| 2004/0081942 A1 | * | 4/2004 | Resnick ..................... 434/107 |

FOREIGN PATENT DOCUMENTS

| | | |
|---|---|---|
| EP | 0 298 727 A2 | 1/1989 |
| EP | 0 382 369 A2 | 8/1990 |
| GB | 801964 | 9/1958 |
| GB | 1432761 | 4/1976 |
| GB | 2196263 A | 4/1988 |

* cited by examiner

Primary Examiner—Chanda L. Harris
(74) Attorney, Agent, or Firm—David E. Rogers; Allen J. Moss; Squire, Sanders & Dempsey L.L.P.

(57) ABSTRACT

Electronic media for teaching others financial principles includes an interactive game that includes a financial lesson. The interactive game may be remotely accessed by users via a network such as the Internet. In certain embodiments the interactive game includes (i) a lesson portion; (ii) a game play portion; and, optionally, (iii) a lesson reinforcement portion. In other embodiments the interactive game includes one or more rewards for successfully completing each interactive game. Such rewards may include a certificate of achievement and/or access to an otherwise inaccessible game.

47 Claims, 28 Drawing Sheets

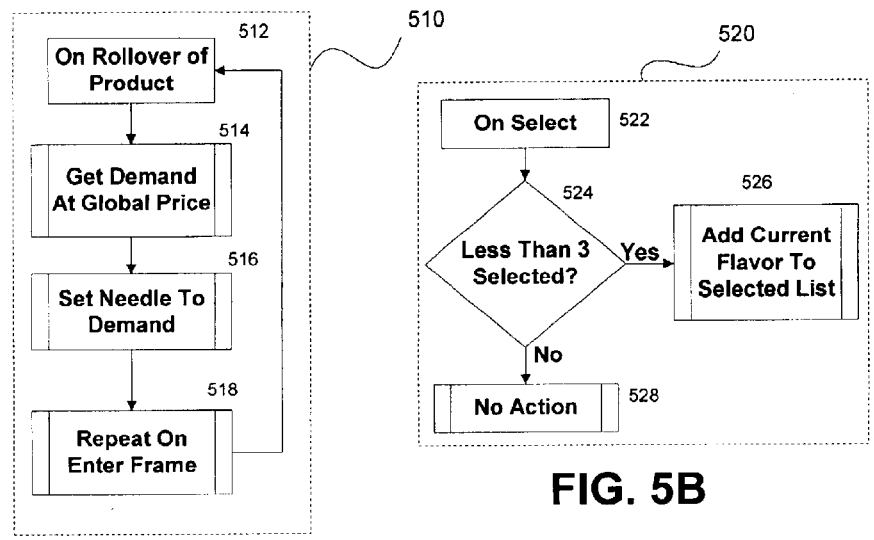
FIG. 5A
FIG. 5B
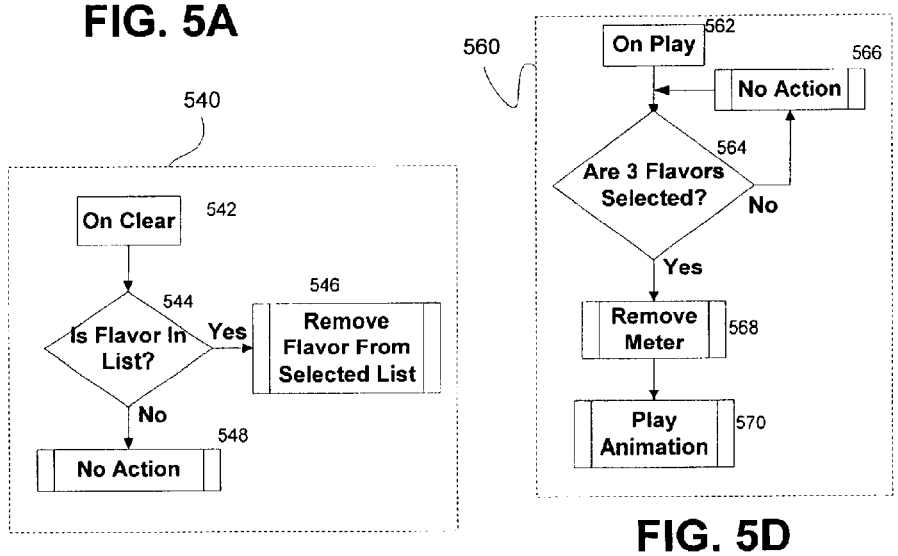
FIG. 5C
FIG. 5D

PRICING AND DEMAND ARRAYS 580

```
var dataSet1_Prices = [".75", "1.00", "1.25"]   ~584
var dataSet1_Flavors = ["MB", "CC", "GB", "DS", "BN"]   ~582
var dataSet1_Costs + ["10", "12", "10", "9", "11"]   ~586
var dataSet1_BestProfit = ["108", "155", "176"]   ~590
var dataSet1_Flavor1_Demand = ["6", "5", "4"]
var dataSet1_Flavor2_Demand = ["6", "5", "4"]
var dataSet1_Flavor3_Demand = ["8", "5", "2"]   }588
var dataSet1_Flavor4_Demand = ["6", "5", "4"]
var dataSet1_Flavor5_Demand = ["8", "5", "2"]

var dataSet1_Demand =
[dataSet1_Flavor1_Demand,dataSet1_Flavor2_Demand,dataSet1_Flavor3_Demand,dataSet1_Flavor4_Demand,
dataSet1_Flavor5_Demand]
```
} 592

```
var dataSet2_Prices = ["75", "1.00","1.25"]
var  dataSet2_Flavors = ["MB", "CC", "GB", "DS", "BN",]
var dataSet2_Costs = ["10", "12", "10", "9", "11"]
var dataSet2_BestProfit = ["93", "155", "220"]
var dataSet2_Flavor1_Demand =["5", "5", "5"]
var dataSet2_Flavor2_Demand =["5", "5", "5"]
var dataSet2_Flavor3_Demand =["7", "5", "3"]
var dataSet2_Flavor4_Demand =["5", "5", "5"]
var dataSet2_Flavor5_Demand =["7", "5", "3"]

var dataSet2_Demand=
[dataSet2_Flavor1_Demand,dataSet2_Flavor2_Demand,dataSet2_Flavor3_Demand,dataSet2_Flavor4_Demand,
dataSet2_Flavor5_Demand]
```
} 594

```
var dataSet3Prices = [".75", "1.00", "1.25"]
var dataSet3_Prices = [".75, "1.00", "1.25"
var dataSet3_Flavors = ["MB", "CC", "GB", "DS", "BN"]
var dataSet3_Costs = ["10", "12", "10", "[", "11"]
var dataSet3_BestProfit = ["123", "155", "132"]
var dataSet3_Flavor1_Demand =["7", "5", "3"]
var dataSet3_Flavor2_Demand =["7", "5", "3"]
var dataSet3_Flavor3_Demand = ["9", "5", "1"]
var dataSet3_Flavor4_Demand =["7", "5", "3"]
var dataSet3_Flavor5_Demand =["9", "5", "1"]

var dataSet3_Demand=
[dataSet3_Flavor1_Demand,dataSet3_Flavor2_Demand,dataSet3_Flavor3_Demand,dataSet3_Flavor4_Demand,
dataSet3_Flavor5_Demand]
```
} 596

```
var whichSet = random[2]   ~597 var Prices = [dataSet1Prices,dataSet2_Prices,dataSet3_Prices]
var Demand = [dataSet1_Demand,dataSet2_Demand,dataSet3_Demand]
var Costs = [dataSet1_Costs,dataSet2_Costs,dataSet3_Costs]
var BestProfit = [dataSet1_BestProfit,dataSet2_BestProfit,dataSet3_BestProfit]
```

Fig. 5E

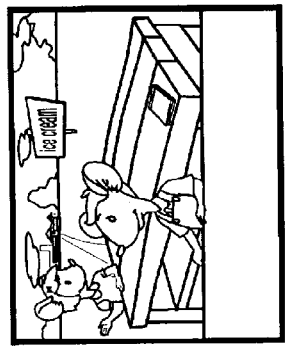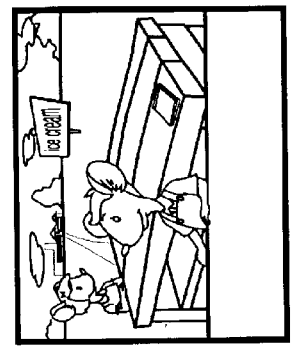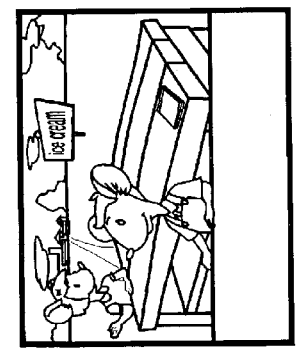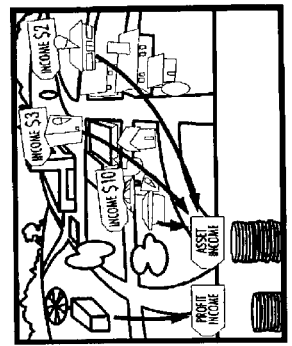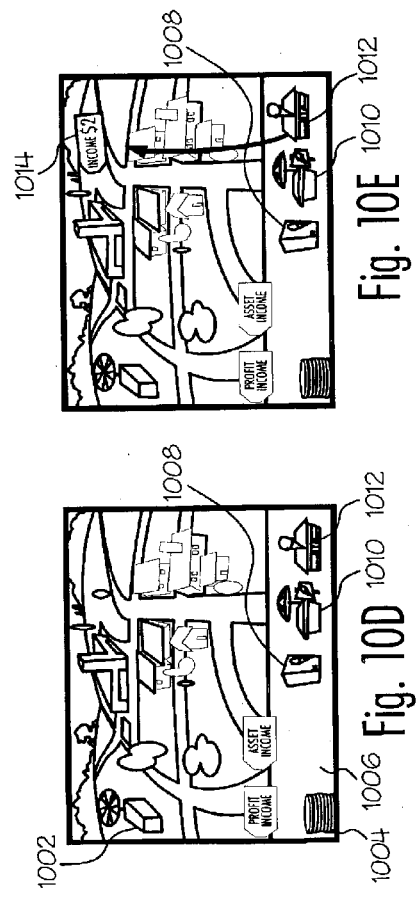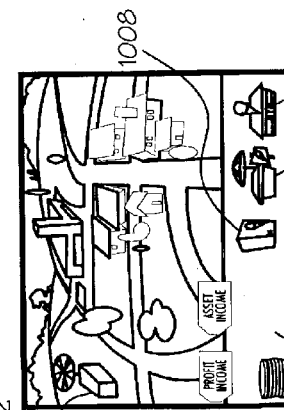

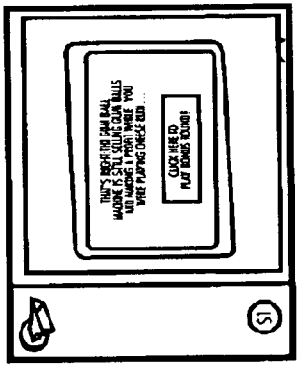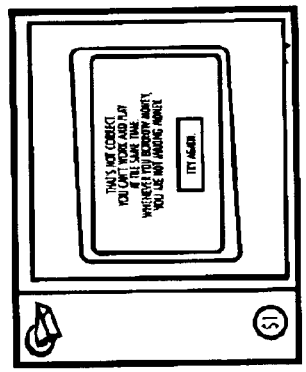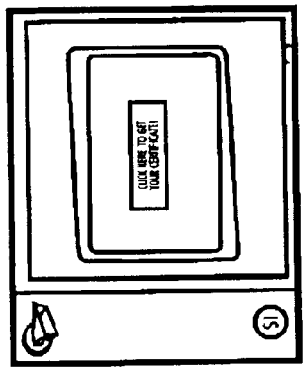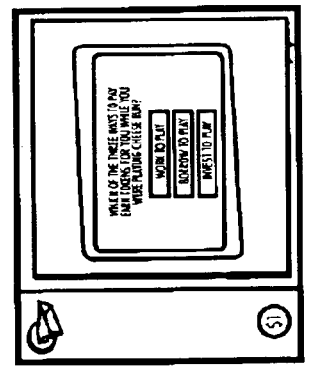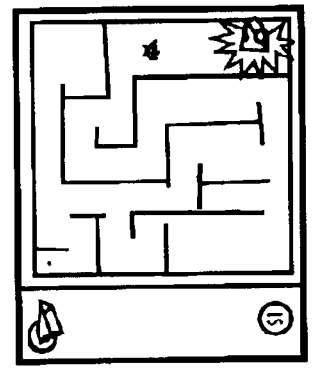

MAZE DATA FILES

1332 SubArrays contained in MainGame Array mainGameArray = [g1v, g18h, g19v, g11v, g28h, g29v, g12v, g12h, g21v, g13h,...]

1334 Individual Positions and Associated Objects, Timing location = [wallLoc, wallDirection, height, timing]

1336
```
g0v = ["g0", "wallVert", 0, 0];
g1v = ["g1", "wallVert", 0, 0];
g1h = ["g1", "wallHoriz", 0, 0];
g2h = ["g2", "wallHoriz", 0, 0];
g3h = ["g3", "wallHoriz", 0, 0];
g4h = ["g4", "wallHoriz", 0, 0];
g5h = ["g5", "wallHoriz", 0, 0];
g6h = ["g6", "wallHoriz", 0, 0];
g7v = ["g7", "wallVert", 0, 0];...
```

Fig. 13B

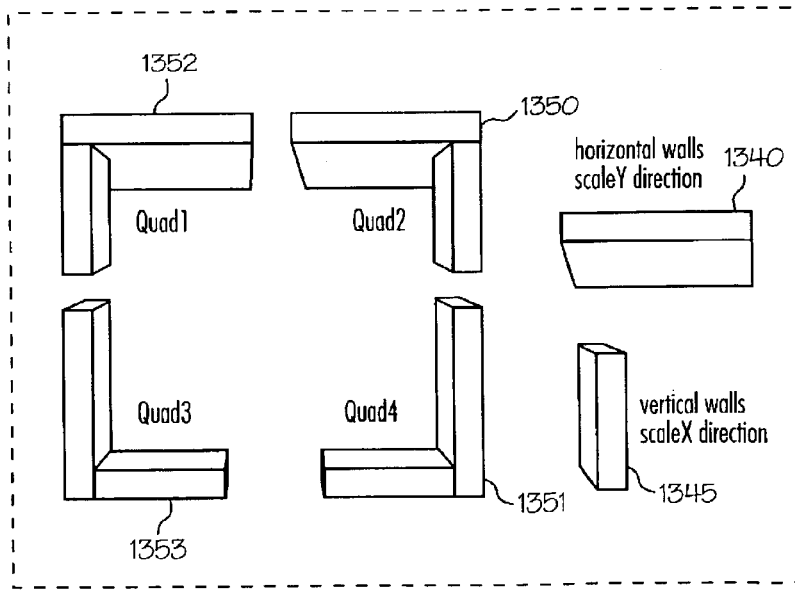

Fig. 13C

INTERACTIVE GAMES FOR TEACHING FINANCIAL PRINCIPLES

COPYRIGHT NOTICE AND AUTHORIZATION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

1. Field of the Invention

The present invention relates to games and methods for teaching financial principles. More particularly, but not exclusively, the invention relates to teaching and reinforcing financial principles through the use of interactive games.

2. Background

Historically, there have been various methods for teaching principles of personal finance, investing and accounting (collectively and individually referred to herein as "financial principles") to the general populace, and to children in particular. U.S. Pat. Nos. 5,826,878, 6,032,957 and 6,106,300 all to Kiyosaki et al., and issued on Oct. 27, 1998, Mar. 7, 2000 and Aug. 22, 2000 respectively (and incorporated herein by reference), disclose respective methods and games for teaching financial principles.

In the past few decades video games and other types of interactive electronic media have become very popular. As used throughout this disclosure, "interactive" means that an audio, video and/or other output occurs in response to a student, game player, adult, child or other type of player's input. Also, as used herein a "networked environment" means an environment where one or more users may remotely access a game over one or more wired or wireless communication networks. Additionally, the term "interactive electronic media," means electronically produced audio and visual content for a user; the content changing in response to a use input. The interest and captivation of audiences using interactive electronic media can be an important ally to education. The attention and focus required for participating in an interactive game ensures that any associated educational aspects of the game would also receive focus and attention. Consequently, it would be beneficial to utilize the advantages of interactive electronic media to teach and/or reinforce financial principles.

Additionally, there can be significant production, distribution, or environmental advantages to using electronic media to teach and/or reinforce financial principles. For example, by providing games that are accessible over the Internet to teach and/or reinforce financial principles, the games can be utilized by any one with access to the Internet. This could include children who may not usually have access to written materials related to financial education but are able to access electronic materials via the Internet. Moreover, most known systems for educating others about financial principles have been associated with person to person contact or required one's presence in a particular physical location, e.g., if playing a board game, typically two or more players must be at the same location and it is impractical to play at some locations due to the bulk of the game and the fact that there are loose pieces. It would be thus advantageous to provide methods and systems for providing financial education wherein a single user could access and utilize the methods and systems. Such method and systems could allow students or other players to access the game and learn financial principles, regardless of where the students or players are located.

In summary, it is particularly difficult to teach/reinforce financial principles and concepts (e.g., price elasticity of demand, profit, giving to charity, debts and return on investment) to persons (including children) using traditional methods. It is therefore desirable to teach and/or reinforce such important financial principles in a manner that is readily comprehensible, accessible and preferably enjoyable.

SUMMARY OF THE INVENTION

The present invention, in one aspect, addresses one or more of the foregoing concerns by providing an interactive game that includes an educational aspect. The game facilitates a lesson about one or more financial principles.

Interactive methods are utilized as part of the games, whereby the games convey, teach and/or reinforce financial principles including, the elasticity of price and demand, profit, giving to charity, debts and return on investment. The principles are taught using interactive games having different levels of complexity for varying age groups or levels of comprehension. The games provide awards for successful completion.

In addition, interactive games using one or more animated characters for teaching financial principles are disclosed. In a preferred embodiment, one or more animated characters provide advice and/or commentary on one or more financial principles such as debt, investment, work, profit, elasticity of price and demand, loan payments, and asset income.

Also disclosed herein are interactive methods and/or games that are accessible to a player over a communications network that may include a local area network, a wide area network, global computer network, or any combination thereof. Preferred embodiments are interactive games and methods for teaching financial principles accessible by a player over the Internet or an intranet.

Also disclosed herein are interactive games including a series of interactive games [suite] that requires player inputs. The games preferably include learning activities facilitated by animated characters and stories. The combination of interactive participation, animated characters and stories enhances student attention and recollection of the educational aspect of the game content.

BRIEF DESCRIPTION OF THE DRAWING

The description of the present invention includes the appended drawings in which like reference numerals denote like elements and in which:

FIGS. 5A–5E illustrate logic sequences and data arrays for implementing the electronic media game of the first embodiment;

FIGS. 10A–10L illustrate sequences, characters and symbols of an electronic media game for teaching financial principles according to a fourth embodiment of the invention;

FIGS. 12A–12K illustrate an example of a normally inaccessible game given access to a player as a reward for completing financial games in one or more of the electronic media games of the present invention;

FIGS. 13A–13C illustrate example program sequences, data files and element structure for the game depicted in FIGS. 12A–12K.

DETAILED DESCRIPTION OF THE PREFERRED EMBODIMENTS

The interactive games of the invention teach and reinforce the fundamental elements of money management. In this context, financial principles including, for example, profits, elasticity of price and demand, investment income, the differences between good verses bad debts, financial stability required to continuously give to charity, and many others may be taught using interactive games. In the following description the term "game" can mean an activity having a set objective to complete. In the present invention, the games typically impart a lesson regarding financial principles.

Figure 1:
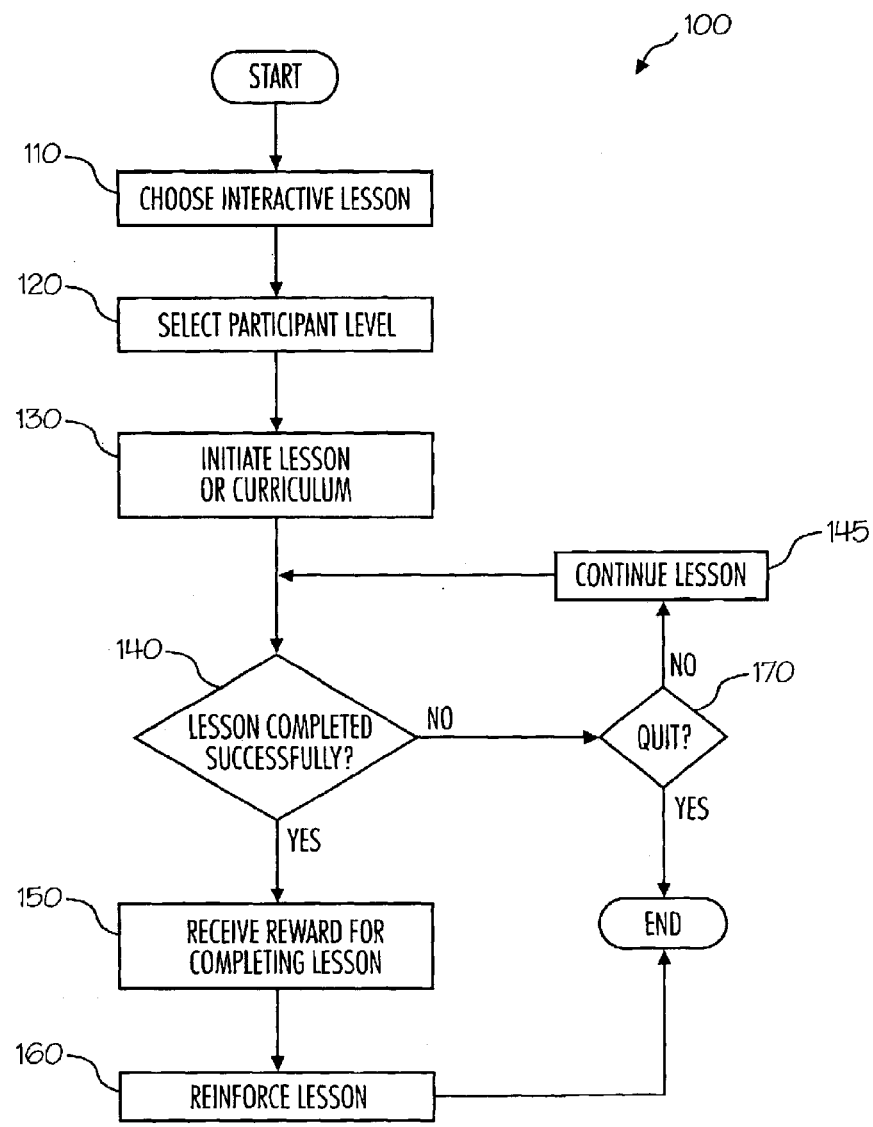
FIG. 1 is a flow diagram illustrating a method for interactive teaching of financial principles according to one embodiment of the present invention.

Turning to FIG. 1, an interactive method 100 for teaching financial principles in accordance with one embodiment of the invention includes: (i) selecting a type of game (action 110) in which a player participates; (ii) selecting the level of difficulty or level of complexity of the game (action 120); (iii) completing one or more interactive games (action 140 and/or 145); and (iv) receiving an award or incentive for completing the interactive game (action 150). Method 100 may further optionally include reinforcing the financial principles in the game to the player before or after rewarding the player for completing the game (action 160). Method 100 has thus been described from the perspective of the actions performed by an end user or player. However, these actions can be modified to describe the perspective of an educational media provider (e.g., enabling selection of difficulty level, providing one or more interactive games for the player to complete; awarding an award), and/or describe the perspective of a network provider (e.g., Internet Service Provider (ISP)) or describe the perspective of a distributor of interactive electronic media.

Examples of interactive games from which a player may choose (or, an educator or provider of a game may provide access to) are described in more detail below. Method 100 does not require that the player choose a particular game (action 110) or level of complexity (action 120), as these actions may be predetermined based on a player's age and/or past history of playing the game. For example, if a player has already completed one of a sequence of games, the next game in the sequence may be automatically chosen by tracking games that have been completed in the sequence of games and presenting the next game in the sequence. Also, a game and/or level of complexity within a game may be chosen automatically based on a player's year in school by storing information regarding the player's year in school and selecting the level of complexity. While game and/or level of complexity of the game may be chosen automatically, the player may also select these factors. For example, a player may enter his/her grade or age when prompted and the interactive game may then select the proper game or level of the game. Alternatively, the player may select an icon representing a certain game or level of game to play. Games may also be selected randomly by a random play algorithm, or sequentially according to a desired syllabus or program outline.

Method 100 may include an option for a player to exit, quit, select a different level or start over at anytime. In a preferred embodiment, if a game is not completed successfully, e.g., the player selected the wrong choices or answers, the player is prompted to quit or exit (action 170) without receiving a reward for completing the game, or repeat the game (action 145). If the player does not desire to quit or exit (action 170), the player may repeat or continue the interactive financial game (action 145).

If the player successfully completes the game (action 140), he or she preferably receives a reward for recognition of his/her efforts (action 150). The reward may be a certificate of achievement, access to an otherwise inaccessible game, merit points or other incentive for completing the interactive financial game successfully as well as any combination thereof. A description of exemplary rewards and bonuses offered to a player is disclosed in further detail hereafter.

Game System & Interface

Figure 2:
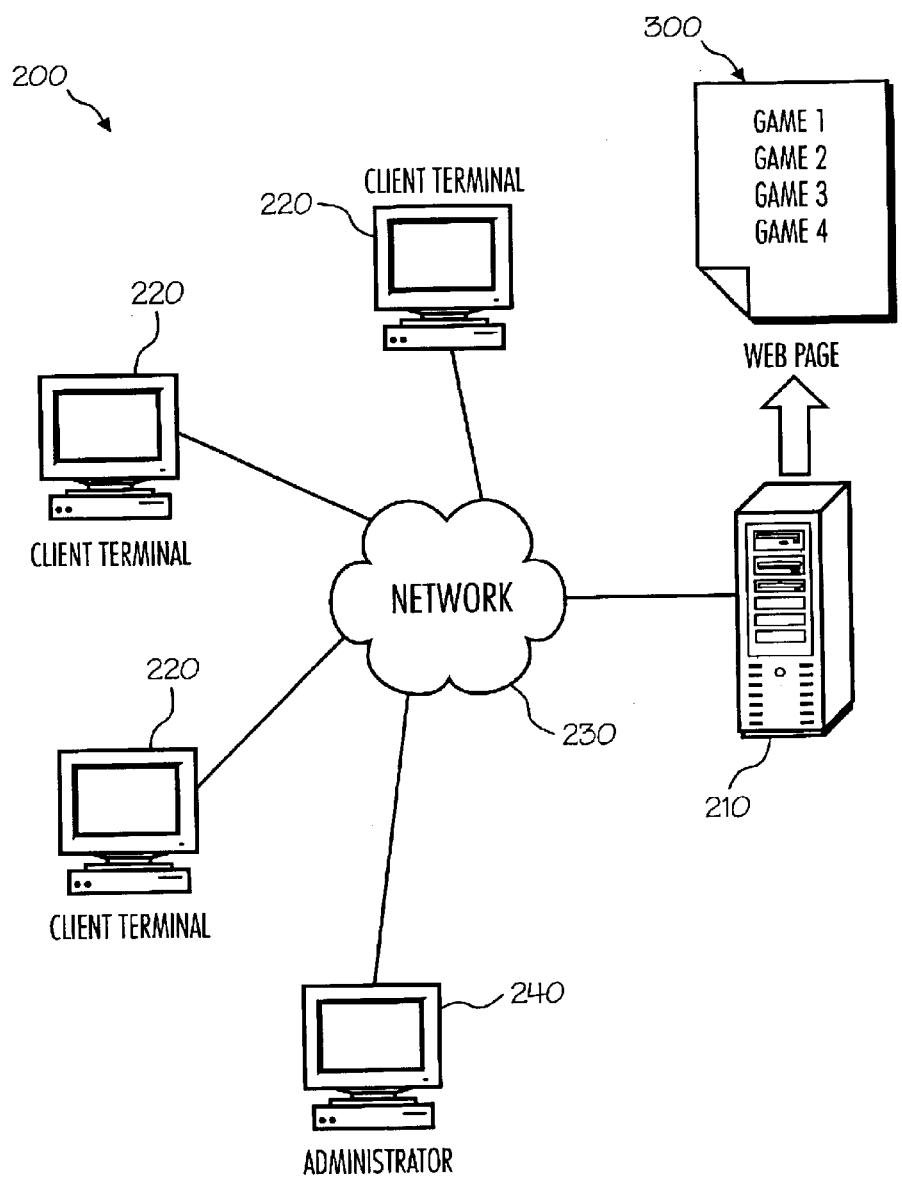
FIG. 2 is a block diagram of a system for interactive teaching of financial principles according to an embodiment of the present invention.

According to certain preferred embodiments of the invention, financial principles are taught using interactive games. In the most preferred embodiments the interactive games are remotely accessible to a player over a communications network such as the Internet. Turning to FIG. 2, a system 200 for providing interactive financial games preferably includes one or more servers 210 that hosts a game site that is accessible by one or more client terminals 220 over communications network 230.

Server 210 may be any type of single server computer or combination of devices that provide the function of enabling access to web page(s) 300 over network 230. Network 230 is any wired or wireless wide area network (WAN), local area network (LAN), virtual private network (VPN) and the like or combination thereof operative to facilitate client terminals 220 access to server 210 and associated page(s) 300. System 200 may also include an administration terminal 240 that serves the function of enabling the person responsible for page 300 (e.g., webmaster) to update, change and otherwise maintain web page 300. Web page 300 is a textual and/or graphical display of computer information displayed on a computer running a web browser program. Typically, client terminal 220 would be running a web browser program. The user of client terminal 220 would enter the location where web page 300 is located on a network. This can be done by entering the uniform resource locator (URL) of the web page 300 in the web browser. The computer code (typically provided in hypertext markup language or HTML) representing web page 300 is sent from web server 210 to the client terminal 220. Terminals 220 and

240 may be any type of computing device operative to communicate over network 230 and interface with server 210. Such devices can include server computers, laptops, personal digital assistants (PDA's), cell phones, desktop computers, and the like. While advantages are derived by enabling access to the interactive financial games by players in remote locations, it is worthy of noting that the inventive games and other inventive aspects discussed herein may also be resident on a single stand alone computer or on a CDROM, a hard drive, and the like as well as on a hand held device for playing the game or any other type of system which may facilitate the use of interactive electronic media.

Figure 3A:
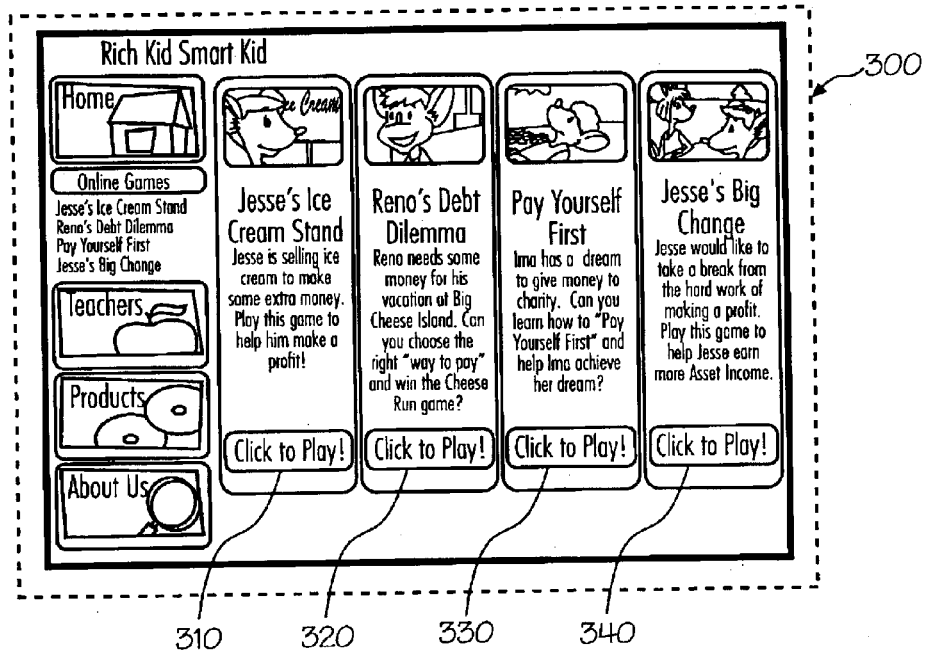
FIGS. 3A–3B illustrate screen samples an electronic interface for an interactive financial game according to the invention.
Figure 3B:
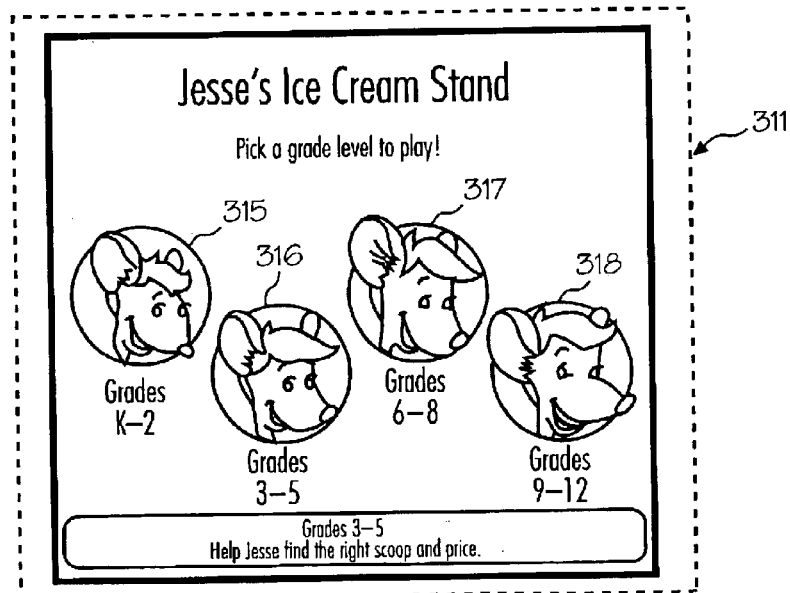

The choice of the desired interactive game and corresponding level of difficulty (FIG. 1, actions 110, 120) may be implemented through any suitable techniques, such as, for example, screens providing indicia of respective choices that may be selected by a player through using a mouse or other device to move an indicia of selection (such as an arrow) over the indicia of respective choices and selecting, a choice, such as by the use of a button on a mouse (known as "clicking"). For example, referring to FIGS. 3A and 3B, choices can be made using web pages 300 and 311. For example, web page 300 (FIG. 3A) may enable a player to access one or more interactive financial games by selecting one or more links or shortcuts 310, 320, 330, 340 corresponding to the respective games that are associated with web page 300. When a player selects (e.g. by clicking) links 310, 320, 330 and/or 340, the player is directed to a specific interactive game associated with the selected link. Preferably a brief description of each interactive game is associated with each link 310, 320, 330 and 340 on web page 300 to advise a player of the contents of each. Accordingly, a player or player may select the type/subject of game desired to play (action 100, FIG. 1) by clicking or selecting the associated link 310, 320, 330 and 340. In the preferred embodiment, respective games are provided on the subjects of: profit and price elasticity of demand (denominated "Jesse's Ice Cream Stand"); income, debts and investments (denominated "Reno's Debt Dilemma"); saving, investments and charitable contributions (denominated "Pay Yourself First"); and profit, income, asset income and financial freedom (denominated "Jesse's Big Change").

After a particular game is selected (FIG. 1, action 110), a choice of difficulty level (action 120, FIG. 1) may be implemented through any suitable techniques, such as, for example, following a link to a respective screen corresponding to the particular game on which respective indicia of difficulty levels that may be selected by a player through are provided. For example, when link 310 is selected, a player may then be directed to web page 311 (FIG. 3B) where the player may then select a level or complexity of game play. In preferred embodiments of the invention, levels of complexity are associated with the age or school grade, or other comprehension classification of a player. Web page 311 preferably includes a plurality of possible levels of play each having a respective link 315, 316, 317 and 318 to the game corresponding to the selected level of play. In one embodiment the levels of play loosely correspond to respective school grade levels in the U.S., including link 315 for kindergarten through second grade (K-2), link 316 for grades three through five (3–5), link 317 for grades six through eight (6–8) and link 318 for grades nine through twelve (9–12). Each respective link 315–318 directs the player to the game that corresponds to that age group's or grade level's characteristics, interests and/or level of comprehension. The various levels for each game are preferably designed to convey similar financial principles, but with varying levels of detail and complexity. To facilitate the teaching of children and to increase children's interest in the different subjects, in one embodiment animated characters are used to present the games. The same characters may be used in each of the different levels of difficulty with the characters appearing older in higher levels. This helps to provide continuity in presentation. Each difficulty level preferably communicating selected principles to a player or players in terms both comprehensible and interesting to a child in the relevant experience/skill category, advancing difficulty levels providing increasing detail and depth of the selected subject at a level of commensurate with the targeted category.

In one embodiment of the game, anthropomorphic rat characters are used to present the games. Each rat character has its own personality. For example, Toki is the host of the game and represents a financial advisor. Jesse is the entrepreneur that represents the small business owner. Reno is an aggressive character and represents the investor. Ima is the generous charitable giver and presents lessons regarding charity. The different personalities are designed to complement each other. They represent different demographics of inventors found in the real world.

In one implementation of the invention, a host web page (e.g., 300, FIG. 3A) contains a presentation configured using a web based authoring language such as MACROMEDIA FLASH. In this embodiment, the web page contains a .SWF file in a FLASHASSIST host application, which allows selection of other, age/comprehension appropriate, FLASH presentations (e.g., 311, FIG. 3B). Instead of, or in addition to, the use of MACROMEDIA FLASH other programs or programming languages that help provide interactive web pages such as JAVA applets and JAVA applications could be utilized.

The following description includes examples of specific games for conveying financial principles using interactive electronic media. The present invention is not limited to the specific examples set forth below since the implementations and financial principles set forth herein describe only a limited number of the possible combinations of implementations and financial principles.

Profits and/or Price Elasticity of Demand

One preferred example of a game comprises a game on the subjects of profits and/or price elasticity of demand entitled "Jesse's Ice Cream Stand." In this game, depending on the age group, the player will learn about selling to maximize profits. Also, tools, such as a unique Demand-O-Meter, an icon that provides a visual indication of demand based on price, are provided to teach economic principles. In a preferred implementation of this embodiment, "Jesse's Ice Cream Stand" is an online game accessed by a player (using a client terminal 220, FIG. 2) over a communications network, for example, the Internet (system 200, FIG. 2). Several variations of this game are provided, each corresponding to a specific level of play selectable (action 120, FIG. 1) through links (315, 316, 317 and 318) on web page 311.

Figure 4A:
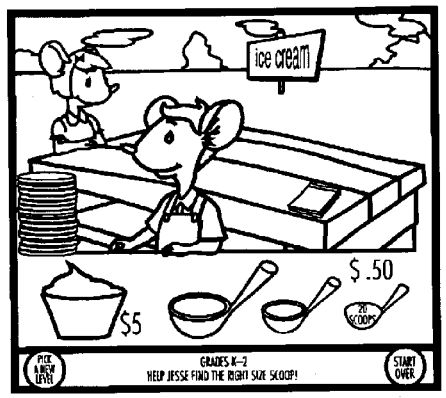
FIGS. 4A–4J illustrate sequences, characters and symbols of an electronic media game for teaching financial principles according to a first exemplary embodiment of the invention.

Referring now to FIG. 4A, at the lowest difficulty level, e.g. for grade levels K-2, "Jesse's Ice Cream Stand" preferably includes a game which communicates financial principles to a player that includes the basic concept of making a profit by selling a product or service, e.g., ice cream, for more money than it cost to obtain the product or service. In one preferred embodiment one or more animated characters discuss the profit concept in relation to the sale of ice cream. In an example implementation of this embodiment, a character named Toki tells her friend Jesse that profit can be derived if Jesse can sell his ice cream for more money than Jesse paid for the ice cream. The player is asked to assist Jesse in making the largest profit from selling ice cream.

One or more animated characters inform the player, audibly and/or visually, of the cost of one bucket of ice cream, and the price at which Jesse will sell individual servings of the ice cream. The player is then asked to help Jesse choose one of three different size scoops for the individual servings where the scoop size is chosen to help Jesse make the most profit. In the example embodiment (FIG. 4A), the individual servings are sold for $0.50 per scoop and scoop sizes include a first size scoop where five scoops can be obtained from the ice cream bucket; a second size scoop where ten scoops can be obtained from the ice cream bucket; and a third size scoop where twenty scoops can be obtained from the ice cream bucket. The player then selects the scoop he/she believes will help Jesse make the largest profit by clicking on the desired scoop. The game or then provides an animated sequence showing the sale of ice cream to several customers of "Jesse's Ice Cream Stand" (FIG. 4E).

Figure 4B:
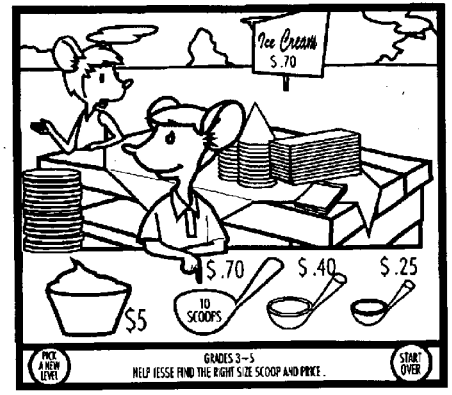
Figure 4C:
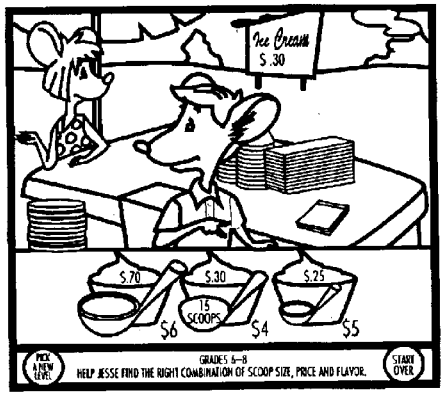
Figure 4D:
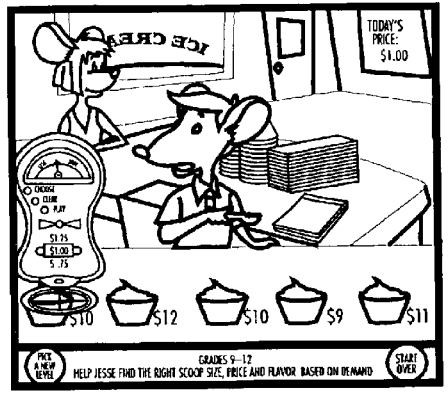
Figure 4E:
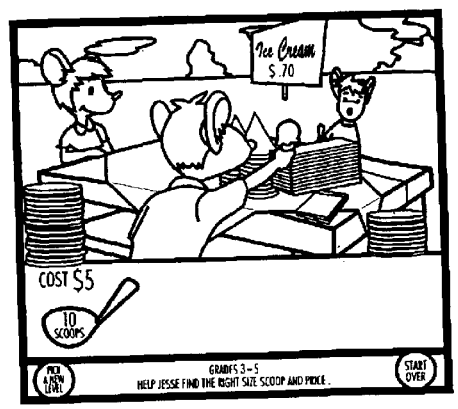
Figure 4F:
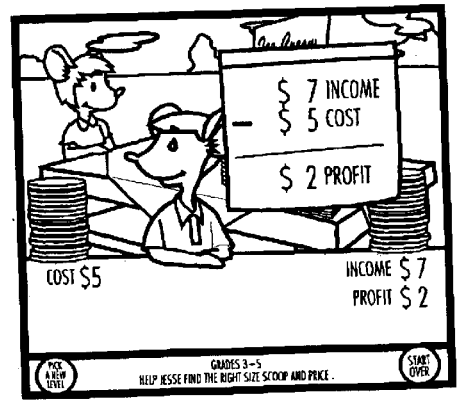
Figure 4G:
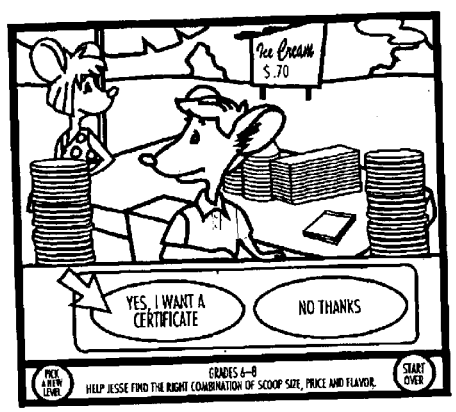
Figure 4H:
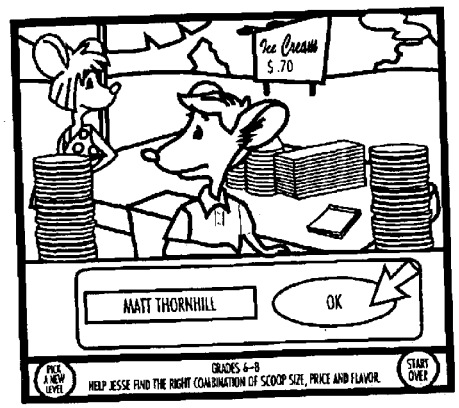

After Jesse is finished selling ice cream, the game continues by calculating and displaying to the player the total profit made from selling the ice cream, which is the money made from sales minus the cost of the product (FIG. 4F). Since the money made from the sale of the ice cream will be the product of: [the price each scoop is sold for] multiplied by [the number of scoops sold], the profit derived from selling ice cream in this K-2 example depends on the size scoop selected by the player. For example, if the first size scoop (e.g., five scoops per bucket) was selected, Jesse will have made no, or very little, profit, whereas if the third size scoop (e.g., twenty scoops per bucket) was selected, Jesse will have made the most profit. If the player selected any scoop size other than the third size scoop, the player is preferably informed of the profit made by Jesse and asked to try again. If, however, the player selected the third size scoop, which renders the most profit, the player may be rewarded, for example, with a certificate of achievement (shown in FIG. 11) or other reward. If the certificate of achievement (as shown in FIG. G), is the reward the player is preferably allowed to enter his or her name on to the certificate (FIG. H) and print a personalized certificate of achievement, if the player chooses to accept the certificate. In alternate embodiments described below, the player may, alternatively or in addition to a certificate or other reward, be given access to a unique game, which is otherwise not accessible. This level of this game provides an understandable way for young children to learn how differing quantities of items sold for the same price and cost of the item translate into profit.

In reference to FIG. 4B, a modified version of "Jesse's Ice Cream Stand" preferred for grade levels 3–5 includes a similar game as the K-2 game but increases the difficulty in determining how to help Jesse make the most profit. In this version, the player is presented with the cost of the ice cream bucket (e.g., $5.00) and three scoop sizes at three different prices. An example of the associated information that may be provided to a player for making a selection is shown in the table below.

|  | Combination 1 | Combination 2 | Combination 3 |
| --- | --- | --- | --- |
| Ice Cream Bucket Cost: | $5 | $5 | $5 |
| # of Scoops per Bucket: | 10 | 15 | 20 |
| Selling Price per Scoop: | $.70 | $.40 | $.20 |

Based on this information, the player selects one of the three scoops per bucket/price per scoop combination that he/she believes will help make the most profit for Jesse. Once a selection is made, the game may visually (with the possible use of audio) animate the selling of ice cream by Jesse and inform the player of the total profit made from its sale. If the player selected Combination 1, the player may be rewarded as previously discussed, since Combination 1 yields the highest profit. Otherwise, the player may be prompted to try again. In this version (associated with grades 3–5), by introducing the additional concept of price per scoop along with number of scoops per bucket, the player can further learn the factors that lead to a profit.

In a modified version associated with grades 6–8 (FIG. 4C), Jesse is selling three flavors of ice cream (each denoted as a bucket) where in each flavor has a different selling price per scoop, a different number of scoops per bucket and a different cost per bucket. Associated example information presented to the player in assisting to help Jesse is shown in the table below:

|  | Combination 1 | Combination 2 | Combination 3 |
| --- | --- | --- | --- |
| Ice Cream Bucket Cost: | $6 | $4 | $5 |
| # of Scoops per Bucket: | 10 | 15 | 20 |
| Selling Price per Scoop: | $.70 | $.30 | $.25 |

Using this information, the player selects the ice cream bucket/number of scoops/price per scoop combination that he/she believes will help Jesse make the most profit. Once a selection is made, the game may optionally show the animated selling of ice cream by Jesse (using a visual display, possibly with the use of audio) and then inform the player of the total profit made from its sale. In this case, if the player selected Combination 1, the player will be rewarded along the lines discussed herein because Combination 1 yields the highest profit. Otherwise, the player may be prompted to try again. For this level, the addition of the cost of the ice cream bucket allows for a more realistic determination of profit and further enhances the player's knowledge of factors that contribute to a profit or loss.

In yet a further modified version, loosely categorized for grades 9–12 (FIG. 4D), the price elasticity of demand is emphasized. In this embodiment, the player is presented with a plurality of types of a product, e.g., flavors of ice cream, each having a cost associated therewith. For this level of play, Toki explains that sometimes maximizing profits may depend on the demand of the product as tied to its selling price. One of the financial principles conveyed in this game is that the demand for certain types of products may vary significantly depending on the price at which they are sold (i.e., there is high price elasticity for such products) whereas the demand for other types of products is less effected by the selling price (i.e. there is low price elasticity for such products). This game teaches the player that product types with low price elasticity of demand can be sold at a higher selling price in order to maximize profits.

To assist the player in determining the price elasticity of demand, Toki provides the player with a tool that measures, and preferably graphically illustrates, the price elasticity of demand for different products. By providing a tool that illustrates (either visually or via audio) the price elasticity of demand for a given product in a game, players can grasp an economic concept more readily by having an (preferably) instantaneous graphical readout of demand at a set price. The player uses this tool to assist Jesse in selecting ice cream flavors that will help him make the most profit.

Figure 4J:
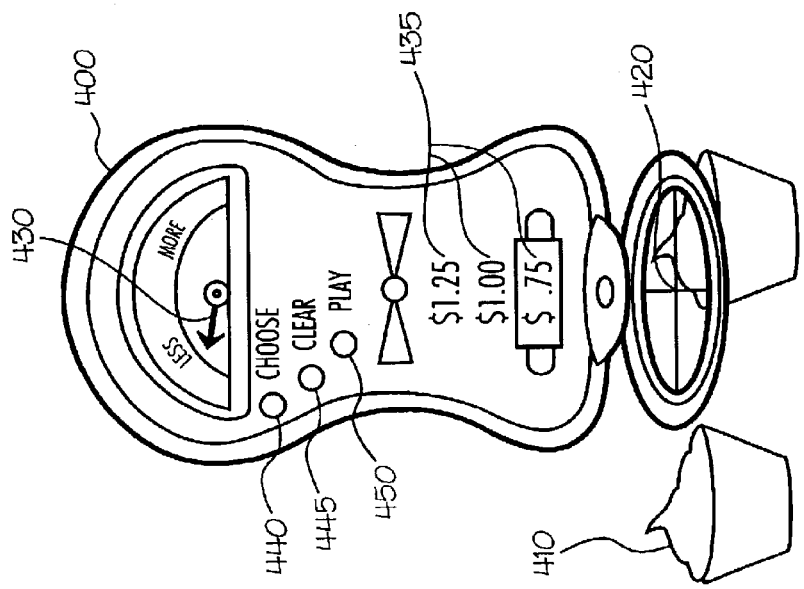

In this embodiment, each individual ice cream flavor has a different price elasticity of demand. Referring to FIG. 4J, in a preferred embodiment, the tool for showing price elasticity of demand is a meter 400 that is referred to as a "Demand-O-Meter." Meter 400 is a graphical device that can be moved around on the player's screen and placed over various product types 410. Preferably, a product from the product types 410 is highlighted when a cross hair 420 of meter 400 is aligned over the product type. Once highlighted, an indicator 430 on the meter 400 reflects the demand of the highlighted product at a given price. A price selector 435 on meter 400 can be used to change the current selling price of the highlighted product. When the price changes, indicator 430 shows the new demand for the highlighted product at the new price. Additional buttons on meter 400 preferably enable the player to select or deselect a product to sell and to initiate the selling of the highlighted product at that price. For example, in one embodiment, meter 400 may include a choose button 440 for selecting one of the ice cream flavors, a clear button 445 for deselecting one of the chosen ice cream flavors and a play button 450, which is activated after enough flavors of ice cream are chosen to initiate game play.

In the preferred embodiment, the player helps Jesse select three out of five available flavors to sell at one price per scoop for each of the three flavors. Each of the product types 410 (e.g., flavor of ice cream) is checked for its price elasticity of demand at different selling prices using meter 400. The cross hairs 420 of meter 400 are aligned over each product of product types 410 and demand needle 430 reflects the demand for each product at the selected selling price. The demand for each product type 410 may vary significantly as the selling price is changed, e.g. by clicking on selling price selector 435.

In FIG. 5A a method 510 to show the demand using meter 400 is shown. Initially it is determined if the meter 400 has been moved over one of the product types (such as an ice cream flavor) (action 512) by, in one embodiment, moving the cross hairs 420 of meter 400 over one of the product types. This is also called a rollover of the meter 400 on a product type 410. If so, the demand for that product at the currently set price is determined (action 514). In one embodiment, the demand data for each product and for each price is stored in an array as will be discussed in further detail in conjunction with FIG. 5E. After the demand data is retrieved, the demand is displayed graphically by setting the indicator 430 of the meter 400 to the demand level (action 516). This method 510 is repeated for every frame of the presentation (action 518). In one embodiment, the frame is updated every one twelfth of a second (animation is at 12 frames per second in one embodiment).

FIG. 5B is a flowchart illustrating a method 520 to select products to be used to play the game. In one embodiment, the player helps Jesse select three out of five flavors to sell. Method 520 starts when the player selects a flavor (action 522). After the flavor is selected, the program checks to determine if less than three flavors have been selected (action 524). If less than three flavors have been selected, the selected flavor is added to the list of selected flavors (action 526). If more than three flavors have already been selected, the next chosen is not added to the list; nothing occurs (action 528). Alternatively, a message may be displayed or audibly played stating that the maximum number of selections has been made. The three flavors requirement is for an embodiment of the game. In other embodiments fewer or more flavors could be selected.

To remove a selected flavor from the list, method 540 as illustrated in FIG. 5C is utilized. First, a flavor to clear from the list of selected flavors is chosen (action 542). Then it is checked to see if the flavor to be cleared is on the list of selected flavors (action 544). If the flavor is on the list, it is removed (action 546). If the flavor is not on the list, no action occurs (action 548). Alternatively, a message can be displayed or played that indicates the flavor chosen to be removed is not on the list.

FIG. 5D illustrates a method 560 to play the game. After choosing the flavors to play at the selected price, the player can choose to play the game (action 562). First, it is checked to see if three flavors have been selected (action 564). If not, no action towards playing the game is taken (action 566). In one embodiment, a message indicating that not enough flavors have been selected is displayed or spoken. If three flavors have been selected, the Demand-O-Meter 400 is removed from the screen (action 568) and the animation showing the selling of ice cream and the monetary results is played (action 570).

Turning to FIG. 5E, data used in the implementation of meter 400 is shown. Pricing and demand information 580 may be loaded into simple arrays that include flavor arrays 582, price arrays 584, cost arrays 586, demand arrays 588, and profit arrays 590. Each of these arrays are loaded into a container array that will then contain all of the information from the previous arrays. The container array forms a data set, which is a collection of all variable data necessary to play the game. In one embodiment there are three data sets. Each respective data set 592, 594 and 596 represent different flavor, price, cost, profit and demand information that is different from the other data sets that can be used to play the game. The data set to be used in the current game is selected randomly, for example by randomly selecting a number corresponding to the index that references a particular data set (see program statement 597). By providing multiple data sets 592, 594 and 596 that can be randomly chosen for each game, players can play the game multiple times with different data sets being used different times, which enhances the playability of the game. This chosen data set may be referenced throughout further game play to access game variables. Logic sequences 510, 520, 530 and 560 (FIGS. 5A–D) may be used in combination with stored pricing and demand data 580 (FIG. 5E) to provide the functional demand/price measuring features of meter 400. Of course, more or less than three data sets can be used. Additionally, it is also possible to use a random number generator within a computer program to randomly generate the variables used to play the game.

Figure 4I:
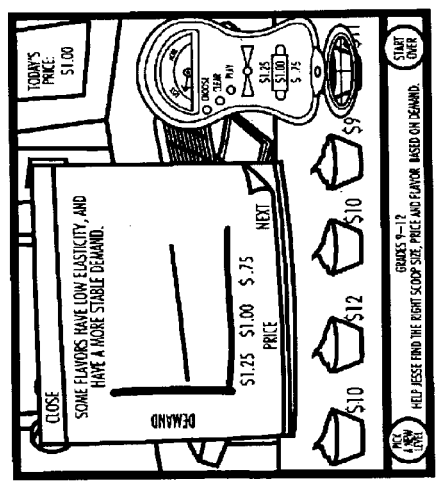
Figure 11:
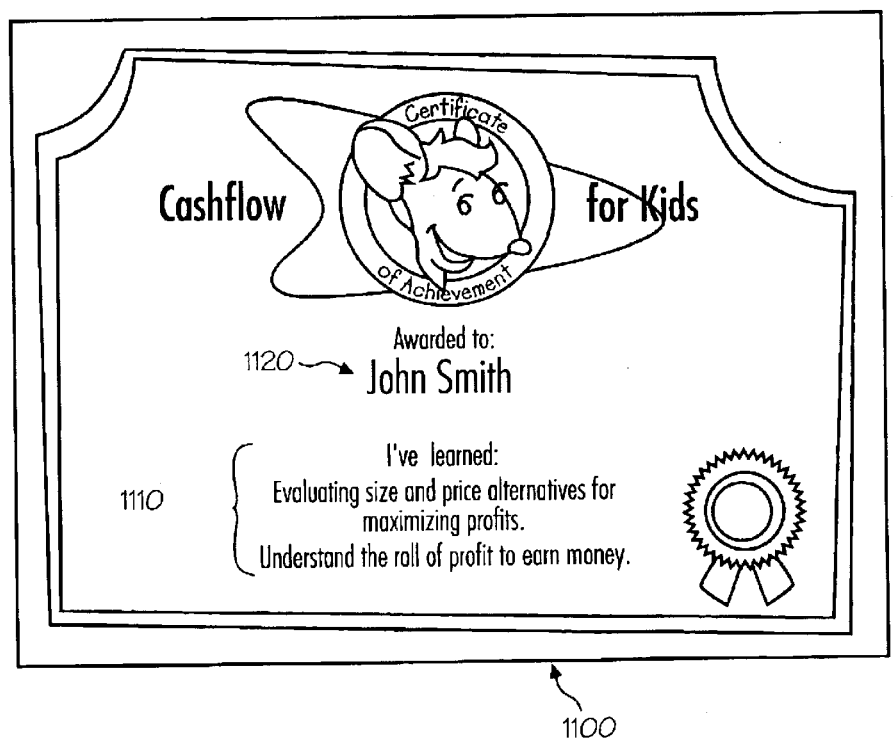
FIG. 11 illustrates and example reward for completing the financial games in the electronic media game of the exemplary embodiment.

When the player has selected three flavors to be sold at the selected price per scoop and the play button 450 on meter 400 is selected, the game continues by displaying an animated Jesse selling the ice cream to customers. The amount of profit made from the sale is announced/displayed to the player and the game is preferably reinforced by reiterating to the player that the selection of flavors having small variances between price and demand can be sold at higher prices for an increased profit (see FIG. 4I). As discussed previously in conjunction with play at the lower level, upon successful completion of the level an incentive may be offered such as a certificate (as seen in FIG. 11), access to a new game or any other motivational item.

Income, Debts & Investments

A preferred example for conveying these financial principles uses an interactive game to demonstrate to a player that there are different types of income, e.g., earned income or investment income, and good and bad debts. In a preferred implementation of this embodiment, "Reno's Debt Dilemma" is an interactive online game accessed by a player over a communications network, for example, the Internet (system 200, FIG. 2). By providing a game that illustrates that working for wages is difficult by providing a proxy for physical work (by clicking on an icon) and that going into bad debt is even worse, children can grasp the concept that the right type of debt, the debt that goes towards income producing assets, is a good debt. The animation of these concepts further helps to keep the players attention and reinforce learning. Reinforcement questions may also be provided that allow for an opportunity for the player to demonstrate actual learning. Also, in one embodiment, an incentive, such as a chance to play a video game provides further motivation for the player to learn the concepts of good and bad debt. There may be certain variations of this game depending on the level of play selected, e.g., grades K-2, grades 3–5, grades 6–8 and grades 9–12.

Figure 6A:
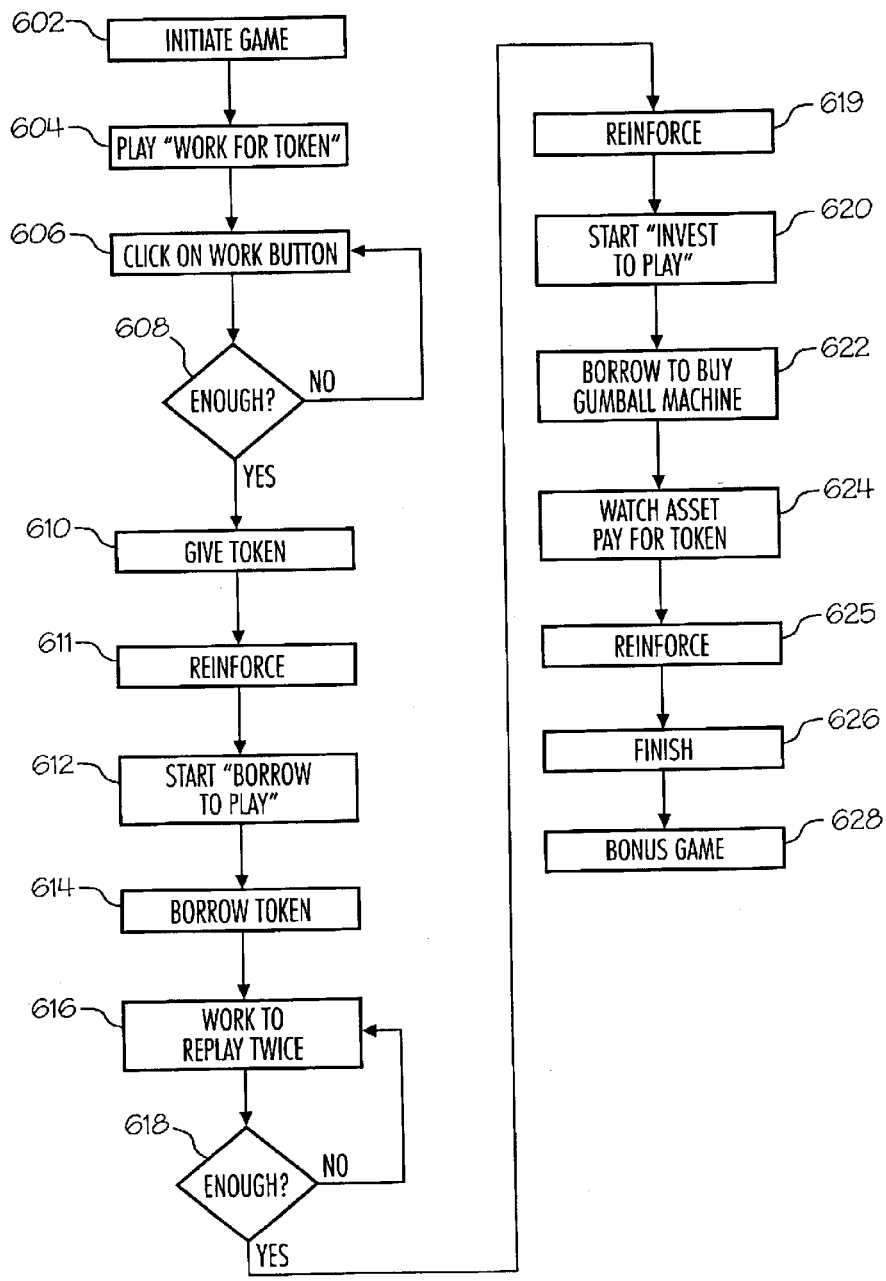
FIGS. 6A–6S illustrate sequences, characters and symbols of an electronic media game for teaching financial principles according to a second embodiment of the invention.
Figure 6B:
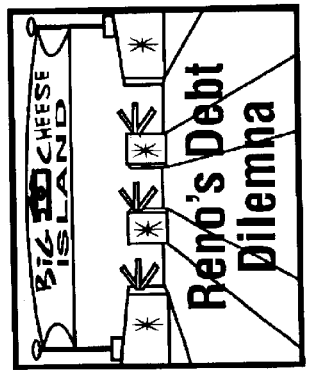
Figure 6C:
Figure 6D:
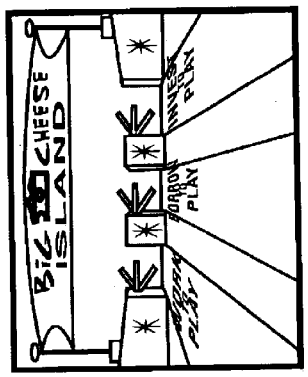
Figure 6E:
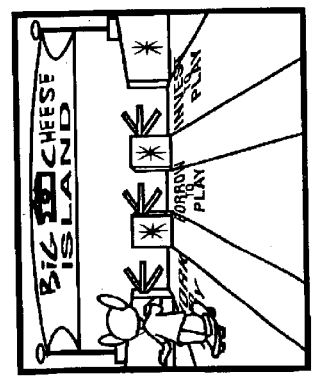
Figure 6F:
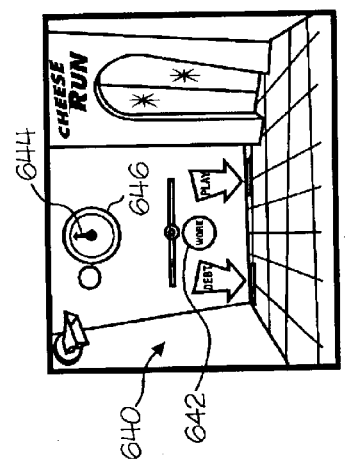
Figure 6G:
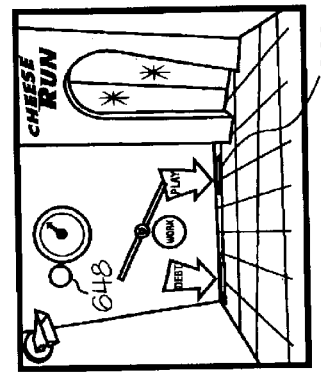
Figure 6H:
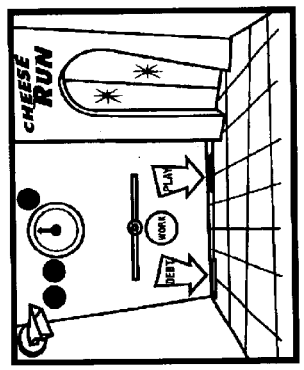
Figure 6J:
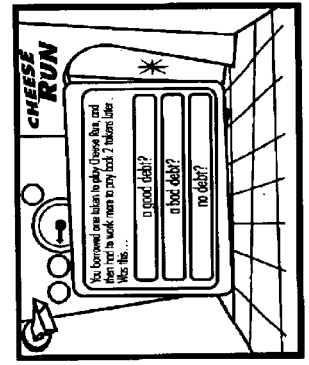
Figure 6I:
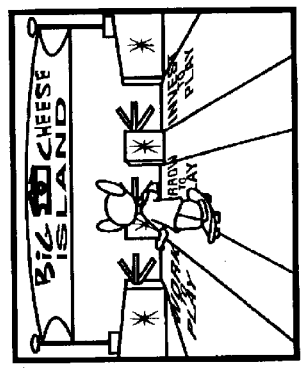
Figure 6L:
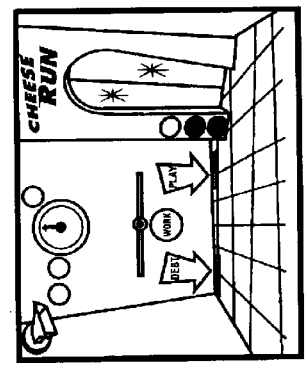
Figure 6K:
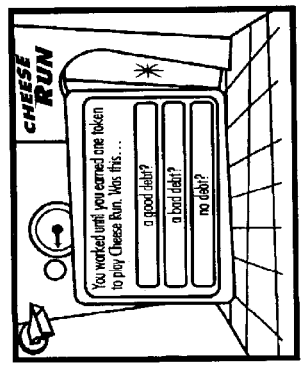
Figure 6M:
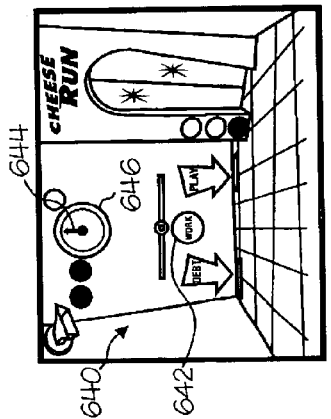
Figure 6O:
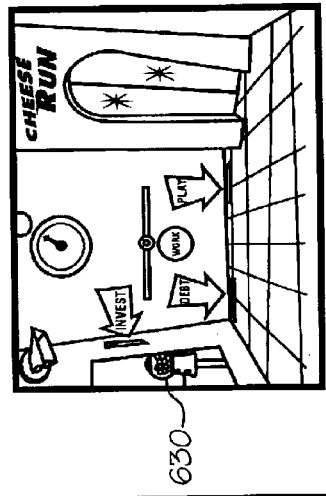
Figure 6P:
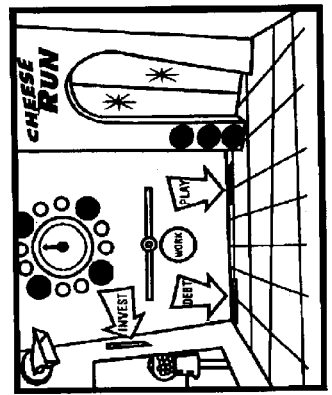
Figure 6Q:
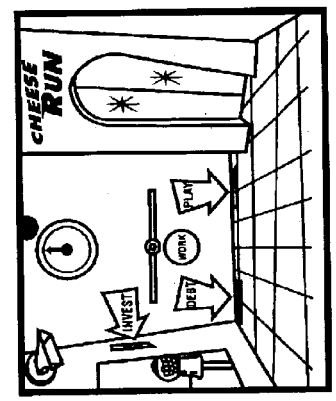
Figure 6R:
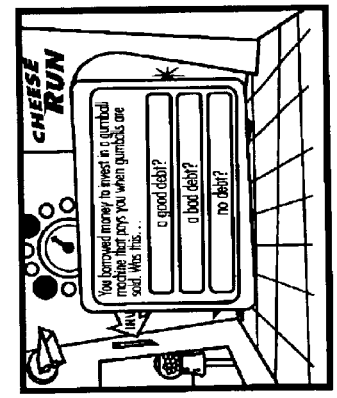

In reference to the screen sequences represented in FIGS. 6B–6R, "Reno's Debt Dilemma" (FIG. 6B) is an interactive game that conveys to a player various ways to obtain money in order to obtain an objective, such as going to an amusement park and playing a new game at the amusement park. The various ways of obtaining money discussed in this game may include, among other things: (i) working for money (or tokens); (ii) borrowing money (or tokens) to spend; and (iii) borrowing money (or tokens) to invest it in something that makes more money.

In a preferred embodiment, these financial principles are conveyed to the player by one or more animated characters that demonstrate how money can be obtained so that a character can pay the required fees necessary to play a new amusement game called "Cheese Run." FIG. 6A is a flowchart illustrating an embodiment of the interactive game. Initially, the game is started, typically after selecting the game from web page 300 (action 602). FIG. 6B illustrates a sample title screen. FIG. 6C is a sample screen that sets the scenario for the game.

In FIG. 6C, Toki 630 states, "Woooow . . . the new cheese run game is opening today." Reno 632, a mouse who has no money but wants to play the game, responds, "I can't wait to play it, but . . . I don't have any money." In FIG. 6D, Toki explains that there are different ways to get money. In one example Toki states, "That's OK . . . there are lots of ways to get money. Here at Big Cheese Island there are three different ways to pay for the games. Some ways are better than others, but you can definitely play even if you don't have any money."

In FIG. 6E, the work for token portion of the game is initiated (action 604). As shown in FIG. 6F, Reno, on a skateboard, skateboards through the turnstile labeled work to play. As he skates in Reno states "Cool, I'm going in."

Next, the player starts to play the game (action 606). As seen in FIG. 6F a work area 640 is illustrated. Work area 640 also includes a work button 642 and a work meter 644 including an indicator needle 646. In an example embodiment, the work performed by a player includes repetitively clicking on the work button 642. Clicking on the work button 642 is typically accomplished by placing a cursor or arrow over the work button 642 and repeatedly selecting the mouse button. Other repetitive movement could also be used such as hitting the same key on a keyboard repeatedly. Clicking on work button 642 causes the indicator needle 646 to advance on work meter 644. After each click, it is determined if enough clicks have been made to earn the money or token (action 608). If not, the player continues to click the work button 642. If enough clicking has occurred (for example, if the indicator needle has moved a full revolution) then the token 648 is earned (action 610).

Once the player has performed enough work, an animated symbol representing a token 648 or dollar drops in to a slot 650 designated for playing the new game, e.g., Cheese Run as seen in FIG. 6G. The "work to play" scenario preferably conveys to the player financial principles including, for example: (i) entertainment, leisure and/or playing may come at a price; (ii) one way to afford the costs associated with entertainment or playing is to earn money or credit by working; and (iii) often times work is not necessarily enjoyable or easy. The game may further include asking the player to answer questions about the "work to play" scenario just experienced by the player (optional action 611). For example, and as illustrated in FIG. 6H, in one embodiment, the player is asked whether working to obtain enough money to play Cheese Run was (a) a good debt; (b) a bad debt; or (c) no debt. If the player provides a wrong answer, e.g., answers (a) or (b), the interactive game preferably indicates that this answer is incorrect and explains why. For example, if the player chose (a), the game might tutor the player by indicating (audibly and/or visually) "That is incorrect; a debt requires you to borrow money. Please try again." However, if the player provides the correct answer, e.g., answer (c), the game may continue to the next manner to obtain money for playing Cheese Run.

In another scenario, the "borrow to play" scenario, of this interactive game (as shown in FIGS. 6I–6M), Reno borrows the token required to play Cheese Run and has to repay the debt with two tokens (or dollars). One token is to pay the principle and one token is to pay the interest. The scenario begins and the initial start screen is FIG. 6I (action 612).

In this scenario, the player, represented by Toki borrows a token (action 614). The player then works to repay the borrowed token and also works to earn an additional token to pay back the cost of the loan (action 616). This is explained by the park announcer in FIG. 6J. The park announcer states, "You are ready to try Borrow to Play. That means you will borrow a token from Big Cheese Island. Borrowing a token costs you another token, so you'll have to work to pay back two tokens before you can move on . . . ".

In FIG. 6K, another token is added to the token stack 652. The park announcer states, "Here's the token you are borrowing . . . now please pay back the token you borrowed by repetitively clicking on the work button". The player clicks on the work button 642 and indicator needle 644 advances as before. This time the player does twice as much work as before (to repay the borrowed token plus interest). Again, it is checked to see if enough work has been done (action 618). If not, work continues. When the work is done the park announcer states, "Thank you for paying back your loan . . . and then working some more to pay back the additional token" as seen in FIG. 6L.

The "borrow to play" scenario conveys to the player financial principles including, for example: (i) one way to pay for things is to borrow money, or incur a debt; (ii) that one may often have to work longer to pay off the debt since both principle and interest must be paid; and (iii) borrowing with nothing to show for it is usually "bad debt." The game may further conclude, as seen in FIG. 6M, by asking the player to answer questions about the "borrow to play" scenario (optional action 619). For example, in a preferred example, the player is asked whether borrowing to money to play Cheese Run was (a) a good debt; (b) a bad debt; or (c) no debt. If the player provides a wrong answer, e.g., answers (a) or (c), the interactive game preferably indicates that "this answer is incorrect and explains that, by way of example, "if you borrow to play, you're in debt, and if you have to pay back more than you borrowed with nothing to show for it, that's not a good debt. Please try again." However, if the player provides the correct answer, e.g., answer (b) "a bad debt," the game may continue to the next manner to obtain money for playing Cheese Run.

Figure 6N:
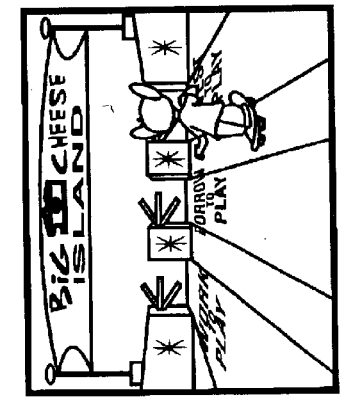

Another scenario of this interactive game, referred to as "invest to play", would start next (action 620, and as seen in FIG. 6N). In one embodiment, as seen in FIG. 6O the park announcer initially states, "Now you'll borrow a token to invest in a Big Cheese Island Gumball Machine. Every time someone on Big Cheese Island buys a gumball, you make a profit." Reno, the player representative character, replies, "Just like Jesse's Ice Cream Stand." The player borrows the token to get the gumball machine 650 (action 622) as seen in FIG. 6P. The park announcer then states, "That's right Reno! Your gumball machine creates tokens to play every time someone buys a gumball." An animated sequence, as shown in FIG. 6Q, is then run showing the purchase of gumballs, which automatically cause the indicator needle 644 to move (action 622). Reno announces, "Hey . . . selling gumballs is making tokens for me!" Thus, Reno borrowed a token to invest in one or more income assets, i.e. gumball machine 630, to earn the money required to play a game, Cheese Run. In this scenario, the player does not have to perform the "work" process as described in the other scenarios above because the income asset (gumball machine 630) earns enough money to make payments on the debt incurred to buy gumball machine 630, as well as providing extra money that Reno may use to play Cheese Run. In a preferred example of this scenario, amusement park patrons are animated purchasing gumballs from Reno's gumball machine 630 and the income derived from the continuous sale of gumballs is applied to pay the debt and set aside for playing Cheese Run.

The "invest to play" scenario preferably conveys to the player financial principles including, for example: (i) one can earn money without having to work by investing in assets that produce income; (ii) one can borrow money to make more money; (iii) one can pay off debts without having to work; (iv) the concepts of loan payments; and (v) the concept of return on investment. This game may further conclude by asking the player to answer questions about the "invest to play" scenario (action 625). For example, as seen in FIG. 6R and in a preferred example, the player is asked whether investing to play Cheese Run was (a) a good debt; (b) a bad debt; or (c) no debt. If the player provides a wrong answer, e.g., answers (b) or (c), the interactive game preferably indicates, for example, "This answer is incorrect; if you borrow tokens, you're in debt, if you invest the borrowed tokens to make more money than you borrowed, this is a good debt. Please try again." However, if the player provides the correct answer, e.g., answer (a) "a good debt," the game may continue by informing the player that he or she is correct and reinforcing why, as well as enabling the player to play the new entertainment game, e.g., Cheese Run, which is otherwise inaccessible to the player.

Figure 6S:
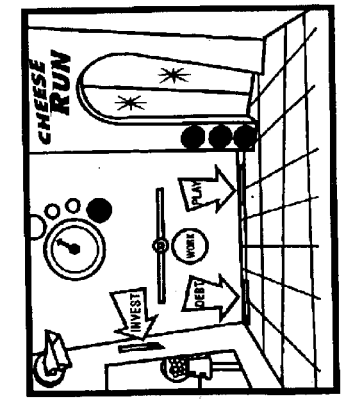

At the end of the "invest to play" portion of the game, the player obtains the free token as this part of the game ends. As seen in FIG. 6S, the park announcer states, "You've earned three tokens to play Cheese Run. You worked for the first token, you borrowed and repaid the debt for the second token and borrowed a token to invest for the third token." After this, the 'Cheese Run' game can initiate (action 628).

In a preferred embodiment, the player is allowed to play the incentive game once for each learned method of obtaining money to play, e.g., three times; once for each token obtained. Preferably, the financial principles are reinforced to the player during play of the entertainment game. For example, at the beginning of each turn, the interactive game may indicate to the player: "this token was earned by working to play," "this token was borrowed to play" and/or "this token was earned by investing to play." Another reinforcement technique may include providing the player a chance to win bonus play by answering one or more questions correctly. For example, the game may present the following bonus question: "Wouldn't it be great to use the 'invest to play' way to play Cheese Run all the time? False?" If the player selects the "False" button, the player might get a message, for example, "Not correct, if you don't invest, you'll have to keep working to play." However if the player selects "True" in this case, the game may indicate for example, "That's right, when you invest to play, you don't need to work to play."

Modifications of this game may be made for different age groups including increasing references to specific monetary amounts and complex financial terms such as compound interest, etc. Complexities may also be added in proportion to the age group or level of play selected. In one embodiment, the difficulty of the entertainment game is proportionate to the age group selected, e.g., time for completing a cheese run is reduced for older players.

The entertainment game to which the player may gain access after successfully completing the interactive financial education game can be any type of action, trivia, or word game, traditional game, educational or not, which is not ordinarily accessible without first completing a game. In one preferred embodiment, the entertainment game is the Cheese Run game as described in further detail in the REWARDS, INCENTIVES & BONUSES section below.

Savings, Investments & Charitable Contributions

In addition to some to the financial principles discussed above, an important financial concept that is taught in this embodiment pertains to being charitable. One aspect of the present invention relates to conveying the principles that one must have a certain degree of financial stability in order to afford being charitable, and/or the more money one has, the more one can afford to give to others. In one embodiment, the game is presented as a side-scrolling game in which the player must learn to avoid certain bad icons (like those representing expenses), while getting good icons (like those representing investments and charitable giving). This game is presented in a quick-paced, interactive video game format, which increases the player's interest in the subject while learning about charitable giving and investments. In one preferred implementation of the invention, discussed in reference to FIGS. 7A–7Z, 8 and 9A–9C, an interactive game that conveys this financial principle and others is referred to as "Pay Yourself First" or "Ima's Dream" or "Ima's Dream: Pay Yourself First".

"Pay Yourself First" teaches that putting one's money aside into different accounts can enable one to afford to give to charity, and especially, to afford to be charitable on a continuing basis. In an exemplary embodiment three separate piggy banks and a plurality of symbolic icons 810 (FIG. 8) are used to convey the concepts of saving, investing, charity and expenses. The specific meaning of each icon is discussed in greater detail below. In a preferred implementation, the game is a side scrolling action game where the player controls a character's movement to collect desirable items, e.g., coins, hearts and money trees and avoid undesirable items, e.g., expenses (Doodads), in order to accumulate money and be able to give the most money to charity.

Figure 7A:
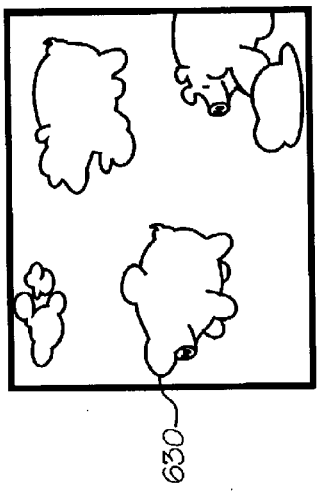
FIGS. 7A–7Z and 8 illustrate sequences, characters and/or symbols of an electronic media game for teaching financial principles according to a third embodiment of the invention.
Figure 7B:
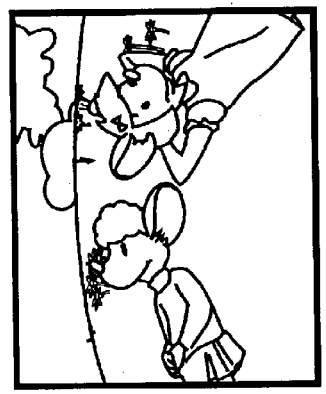
Figure 7C:
Figure 7D:
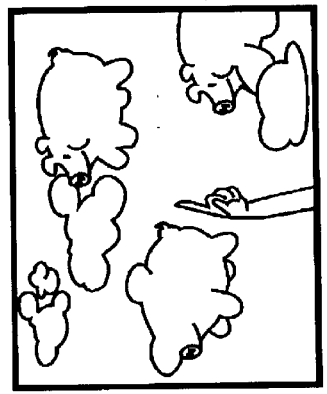
Figure 7E:
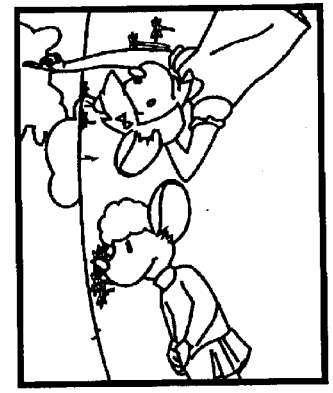
Figure 7F:
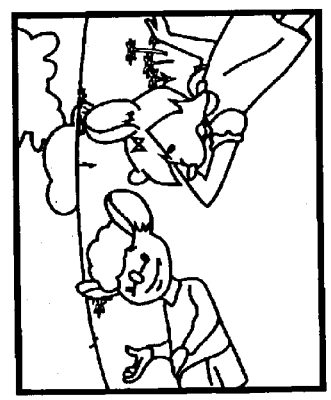
Figure 7G:
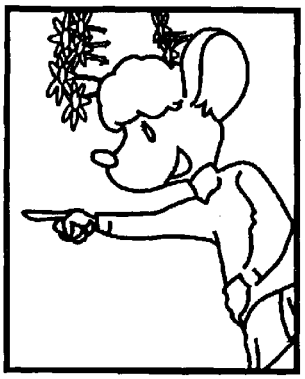
Figure 7H:

In the beginning, (e.g., FIGS. 7A–7H), animated characters, e.g., Toki and Ima, discuss how nice it would be to be able to give money to people who need it. FIG. 7A illustrates an exemplary introduction screen that displays the title of the game "Ima's Dream: Pay Yourself First" while the introduction music is played. In FIG. 7B, Toki and Ima are depicted as lying in a field. Toki says, "Ima, wouldn't it be great to be really rich?" Ima, in wishful way replies, "Oh, yes! Then I could to give lots of money to charity—to help people who need it." In FIG. 7C clouds shaped like piggy banks are depicted. Off screen Toki states, "That's a beautiful dream Ima." FIG. 7D again shows Ima and Toki talking. Ima says, "Yeah, but how am I going to do it if I'm not rich?" To which Toki responds, "You don't have to be rich to get started . . . It starts with something called 'Pay Yourself First'." FIGS. 7E and 7F continues to illustrate the Toki and Ima dialogue. Ima asks, "'Pay Yourself First'? How does that work?" Toki explains, "As you earn money, put some in the first piggy bank for Giving, put some in the second piggy bank for Saving and put some in the third piggy bank for Making Money." FIG. 7G is a close up of Ima. Ima asks, "Why not just put it all in the giving piggy bank?" Toki responds to this question by stating, "The better you handle your money the richer you become. The richer you become, the more you can give. Here . . . Lets play the 'Pay Yourself First' Game . . . " as seen in FIG. 7H. In this introductory section, Toki is trying to explain that as you earn money in life, you should put it into three different piggy banks, one for giving, one for saving and one for investing to make more money. A basic financial principle conveyed by Toki is, the better you handle your money, the richer you become; the richer you become, the more you can afford to give to others.

Next, the game may preferably provide the player with brief instructions on how to play the game. In a preferred embodiment, instructions are provided to the player on how to control the movements of the interactive character, e.g., Ima (FIG. 7J) and game play concepts are demonstrated by providing an animated tutorial of game play. In an example implementation of this tutorial, the player moves Ima through the side-scrolling screen to encounter objects. When Ima touches or encounters the first one of each particular type of item or symbolic icon, the game is paused while the game announcer describes the concept and meaning behind the encountered item (see symbolic icons 810 in FIG. 8) and how it relates to game play. However, this type of interactive tutorial is not required as the player might become educated on game play through, for example, reading displayed text or listening to an audio file that conveys the instructions.

Figure 7I:
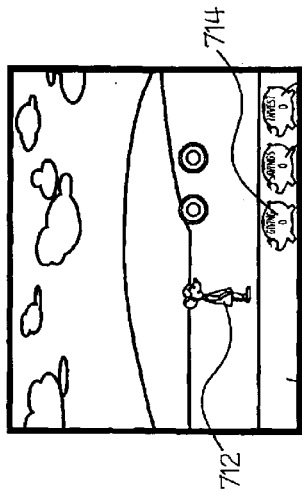

FIGS. 7I–7O are exemplary screens illustrating the game tutorial. In FIG. 7I, the game playing field 710 is displayed, along with Ima 712, a giving piggy bank 714, a savings piggy bank 716 and an invest piggy bank 718. The piggy banks 714, 716 and 718 are displayed on a toolbar 720 at the bottom of the playing field. Also displayed are icons 810, as seen in FIG. 8. Different types of icons can be used in the game. For example, a coin icon 812 represents a payment to all three piggy banks. A doodad 814 (also known as an expenses) when encountered usually eliminates any accumulation in the savings piggy bank. A heart icon 816, when encountered, accepts some of the accumulations in the giving piggy bank and provides temporary immunity from encountered doodads 814. When a money tree icon 818 is encountered, an investment is created. When the money sign icon 820 is encountered, the savings, giving and investment amounts are increased by the amount of the investment yield. At the start of the game, as seen in FIG. 7I, Toki states, "To make your dream come true, you must use your money carefully so you will have enough for each of your three piggy banks."

Figure 7J:
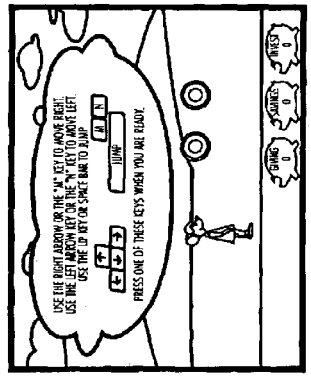
Figure 7K:
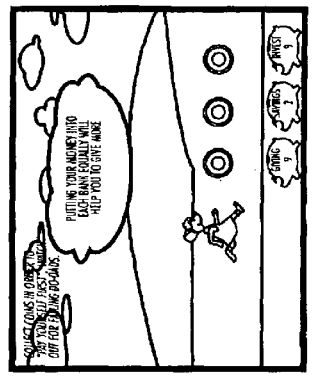
Figure 7L:
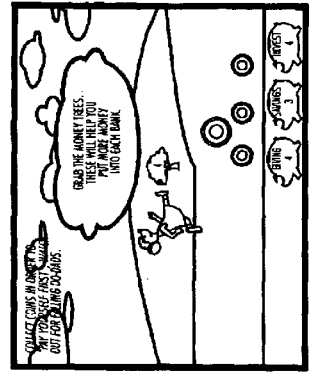
Figure 7O:
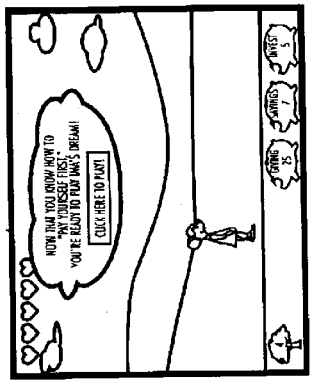
Figure 7R:
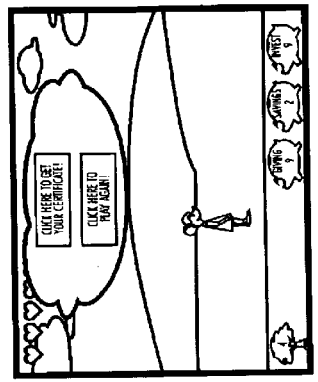
Figure 7N:
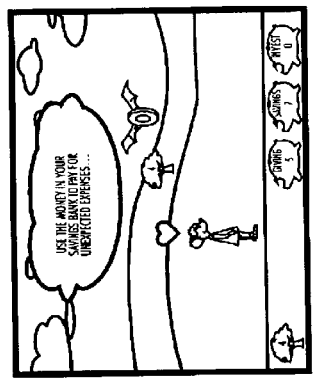
Figure 7Q:
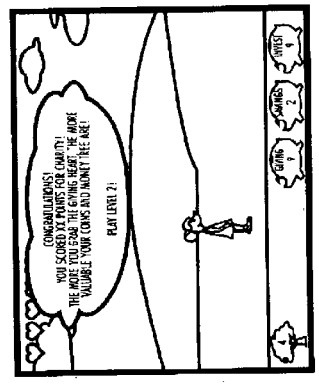
Figure 7M:
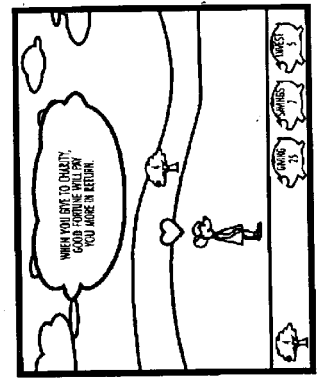
Figure 8:
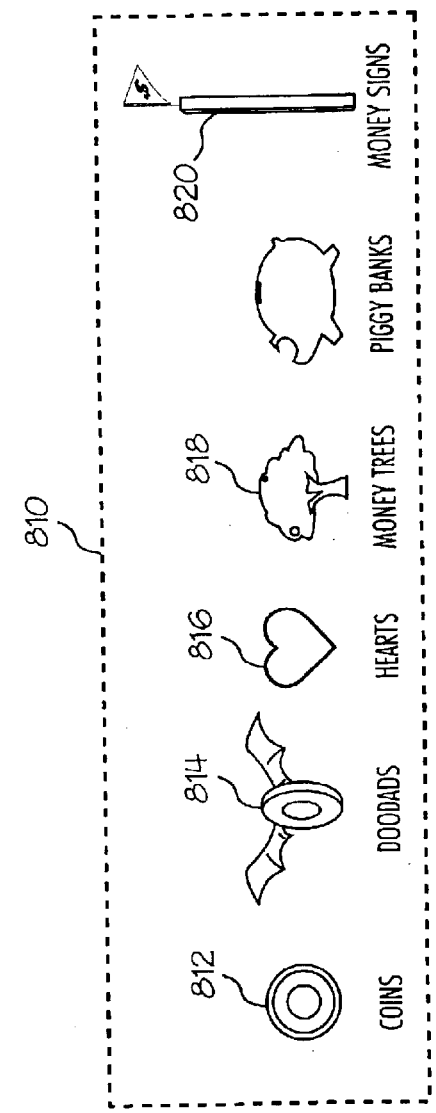

In FIG. 7J, instructions concerning which keys to use to play the game are displayed. At this screen Toki states, "Use the arrow keys to move Ima . . . " When the player successfully uses a movement key, Toki says, "Here we go!" In one embodiment, the game is a side scrolling game where the character is moving either left or right and icons 810 are encountered as the player moves. The keys used for movement includes keys to move the Ima character 712 left and right and to jump. Of course, instead of using the keyboard, character movement can be done using any apparatus that allows for a player input to be translated into a screen character's movement including a mouse, a joystick, a game pad, a trackball, using a touch screen display and the like. Once the Ima character 712 is moving, it encounters (hits) the first set of coins as seen in FIG. 7K. When this occurs the game pauses and a text balloon appears that explains that putting money into each of the three piggy banks helps one to give more. After that textual information is displayed, the player can continue to play the demo. In FIG. 7L, the Ima character 712 reaches a set of money tree icons 818. The game pauses and a text balloon appears that describes what investments are and their importance to financial well being. When money tree 818 is encountered, an icon for that tree is placed on the bottom of the screen as seen in FIG. 7M. Also in FIG. 7M, the Ima character 712 is shown encountering a heart icon 812. When this occurs, a text balloon is displayed explaining the importance of giving. In FIG. 7N, the Ima character 712 is shown encountering a doodad 814 (an expense). A popup text balloon explains how expenses impact savings and how a heart can give protection from a doodad for a period of time. After that is complete, a finish screen pops up that indicates the player now knows how to play the game and then gives an option to play the game. This is illustrated in FIG. 7O. While pop up text balloons are illustrated in the preceding examples as the way to convey operating instructions to the players, other methods can be used including having an announcer speak the rules.

Figure 7P:
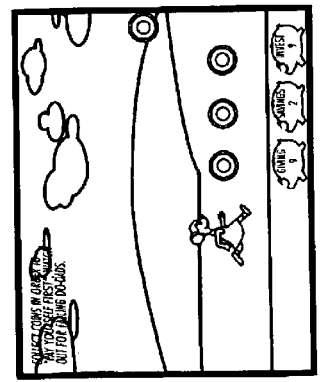
Figure 7S:
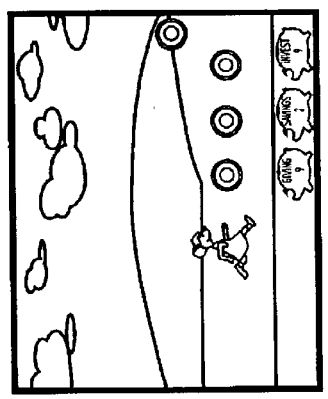

After the tutorial on how to play the game is given, the actual game is played. FIG. 7P displays a screen showing the beginning of a level of the game. In an example embodiment utilizing symbolic tokens 810 represented in FIG. 8, the player (graphically represented as Ima 712) moves along the side scrolling background to collect randomly placed coins 812 or tokens that, when touched by Ima 712, are evenly distributed in the three piggy banks 714, 716 and 718. The player also collects investments, e.g., money trees 818, to represent investments made with the money collected in the investment piggy bank. The player may also encounter a heart icon 816, which protects the player from expenses, e.g. falling doodads 814, and increases the value of Ima's investments (in one embodiment encountering a money tree doubles the value of Ima's investments). When Ima passes a money line or money symbol 820, the investments pay into the piggy banks 714, 716, and 718.

Figure 9A:
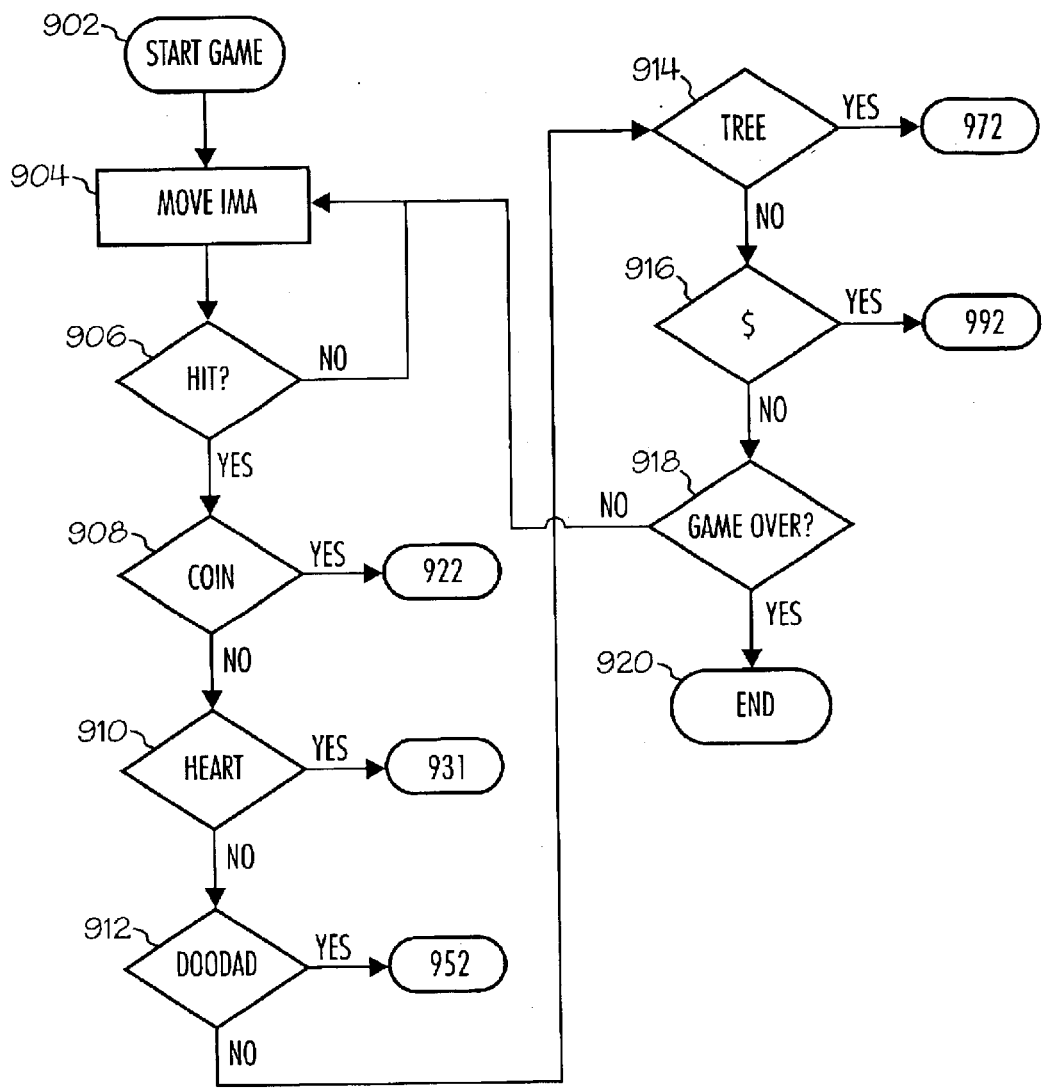
FIGS. 9A–9C illustrate logic sequences for implementing the electronic media game of the third embodiment.
Figure 9B:
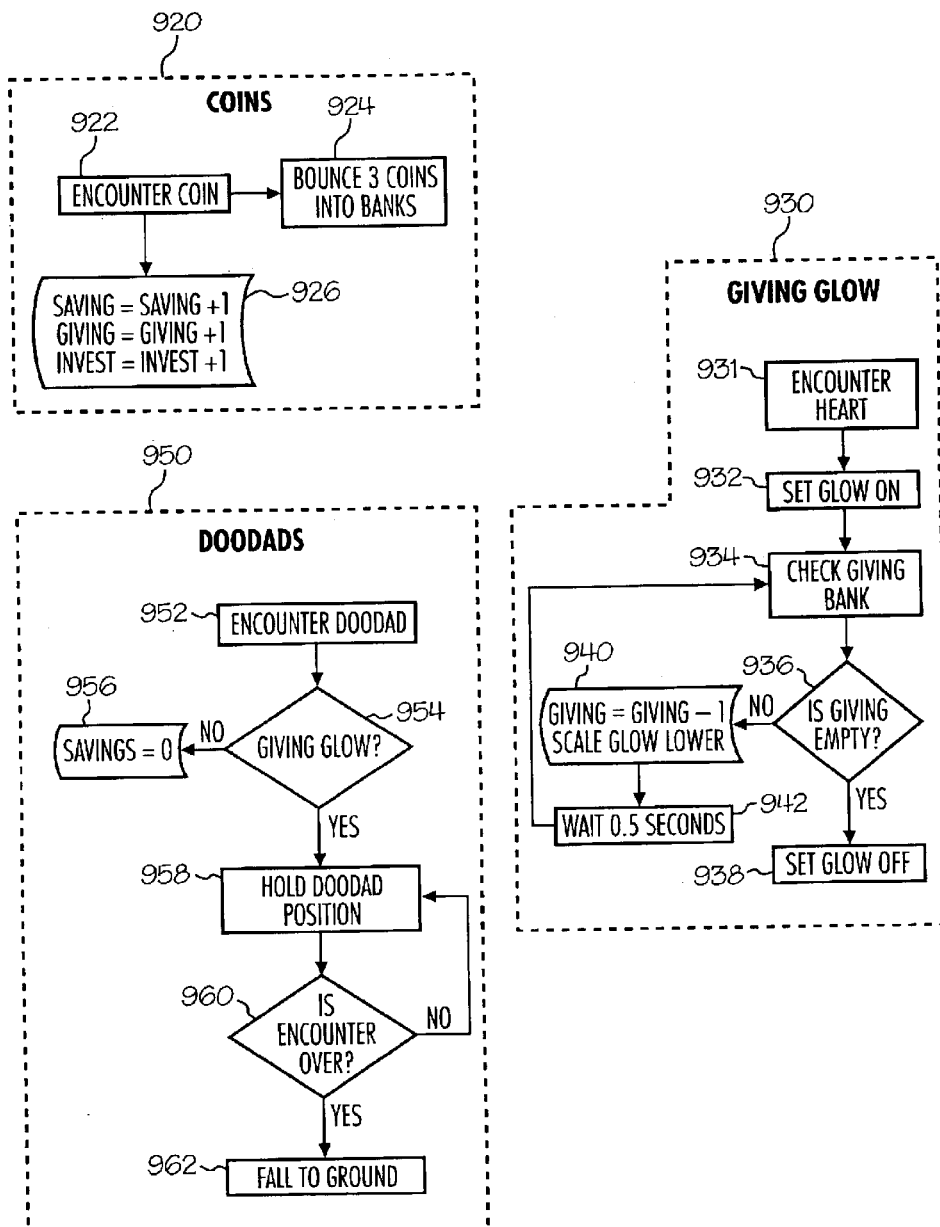
Figure 9C:
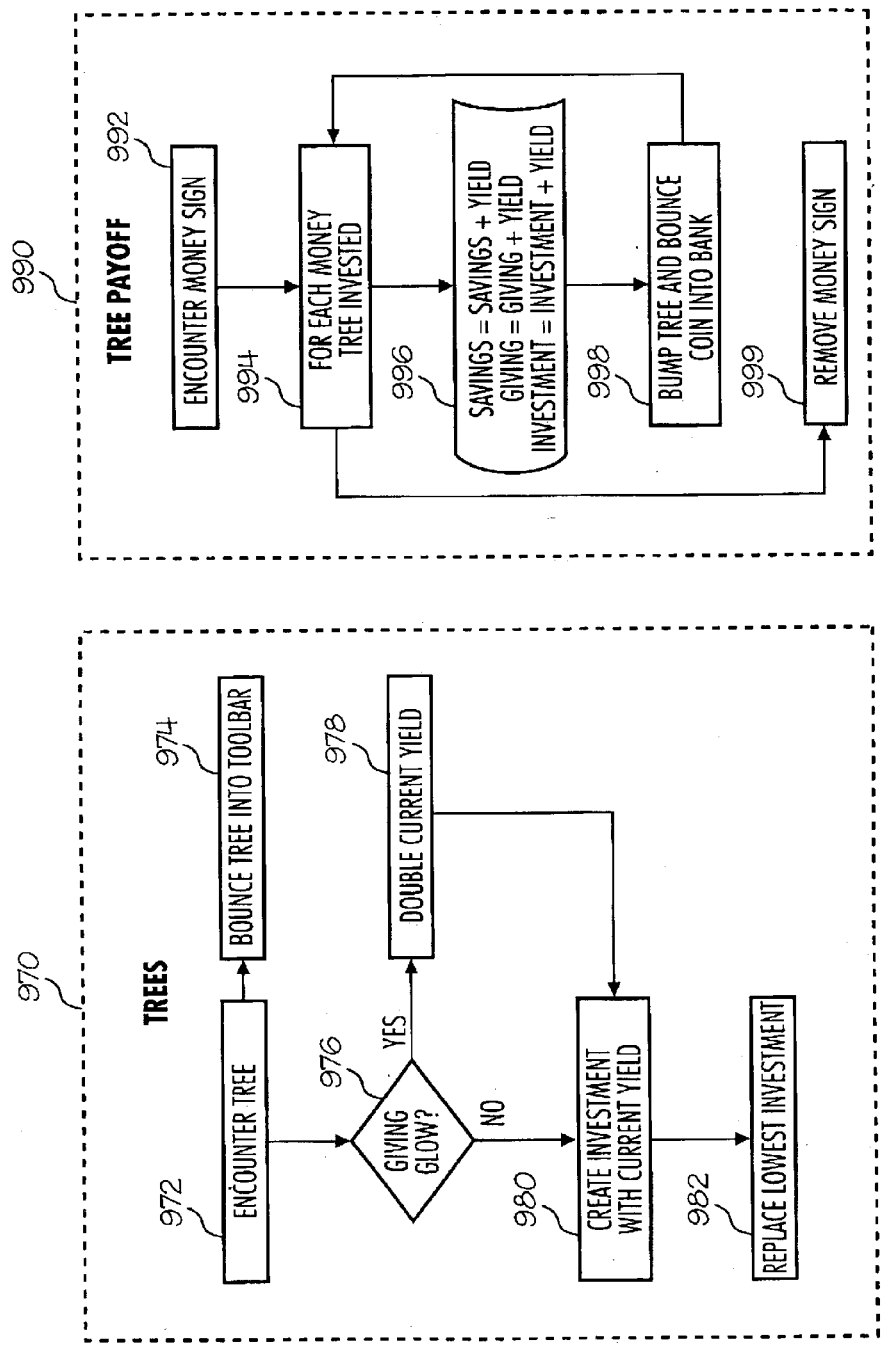

FIGS. 9A, 9B and 9C are logic sequences for an example implementation of the "Pay Yourself First" game. The "Pay Yourself First" game, as described earlier is an interactive game that helps the player to learn about savings and charitable giving. FIG. 9A outlines the playing of a preferred embodiment of the complete game, it being understood that other "Pay Yourself First" games may be used. The game is initiated (action 902). The player then moves the character (for example, the Ima character 712) using the keyboard or other input device (action 904). When the player is moving the Ima character 712, the program continuously checks to see if the Ima character 712 has encountered or run into one of the icons 810. This is known as the "hit test," the position of the character and the position of the icons are checked to see if any part overlaps. If so, there is a hit (action 906). If there is no hit, the player continues to move the Ima character 712. If there is a hit, the program needs to determine which icon the Ima character encountered. If the character hit was a coin (action 908), logic sequence 920, which is the logic sequence for encountering a coin is examined. In logic sequence 920, when a coin is encountered (action 922), the animation depicts three coins being sent to each piggy bank (action 924). The amount of coins in the saving piggy bank 714, the giving piggy bank 716 and the investment piggy bank 718 is incremented by one (action 926).

If a heart icon 816 is encountered (action 910) then logic flow 930 is examined. In logic flow 930, a heart icon is encountered (action 931). This causes a heart icon 816 to glow onscreen (also known as setting the giving glow on)(action 932). After the heart is set to glow the giving bank is checked to see if it has a balance (actions 934 and 936). If there are no coins accumulated in the giving piggy bank, the giving glow heart is set to off (action 938). If there is a balance, one coin is deleted from the giving piggy bank and the glow on the heart icon is decreased (action 940). After that the system waits for a period of time (in one embodiment a half of a second)(action 942) and then the giving piggy bank is checked for a balance (actions 934 and 936). If there is a balance, then the number of coins in the giving piggy bank is decreased by one coin and the system waits for a period of time before checking again. If the giving piggy bank is empty, the heart glow turns off. Thus the system loops around actions 940 and 942 until the giving piggy bank is empty. The actual graphics and display of icons may vary without departing from the scope of the present invention. For example, in one embodiment, each time the heart icon is encountered a heart icon is added to a display of heart icons located along the top edge of the game screen. The accumulation of the hearts represents the charitable giving level of the player during the game play.

If the Ima character 712 encountered a doodad icon 814 (action 912), logic sequence 950 is checked. After it is determined that a doodad icon 814 has been encountered (action 952), the system is checked to see if the giving glow is set to on (heart is glowing) (action 954). If the heart is not set to on, then any accumulations in the savings piggy bank 714 is eliminated and set to zero (action 956). If the heart is set to glow (such as from recently encountering a heart icon 816), then the player is immune from the expense represented by the doodad icon 814. The doodad icon 814 stays in the encountered position (action 958) until the player moves the Ima character icon 712 and ends the encounter (actions 960 and 962). Once the encounter is over, in the case where the giving glow is on, the doodad icon 814 falls to the ground (action 962).

If the icon encountered is money tree icon 818 then logic control sequence 970 is examined. If money tree icon 818 is encountered (action 972), the money tree icon 818 moves to the toolbar 720 at the bottom of the playing field 710 (action 974). Then, it is checked to see if the giving glow is on (action 976). If it is, the money tree icon 818 is given a yield that is double the current yield (action 978). If the giving glow is not on, the money tree 818 is given a yield equal to the current yield (action 980). Also, the money tree 818 with the lowest yield is replaced (action 982). Depending on the level played, there can be one or more money trees.

When a money sign icon 820 is encountered (action 916), the money trees 818 are paid off as seen in logic sequence 990. When the money sign icon 820 is encountered (action 992), for each money tree 818 the savings piggy bank 714, the giving piggy bank 716 and the investment piggy bank 718 is incremented by the yield of each money tree 818 (action 996). Each money tree 818 is given an animated sequence where the tree is bumped and the coins bounce into the piggy banks (action 998). The incrementing of the piggy banks and animation of the coins is done for each money tree 818 (action 994). The money sign is then removed from the screen (action 999).

Figure 7T:
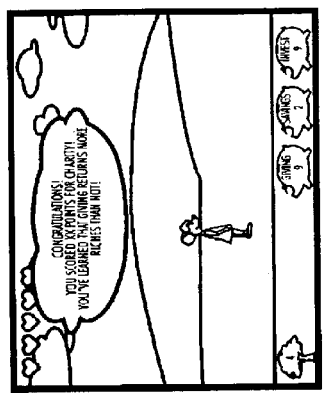
Figure 7U:
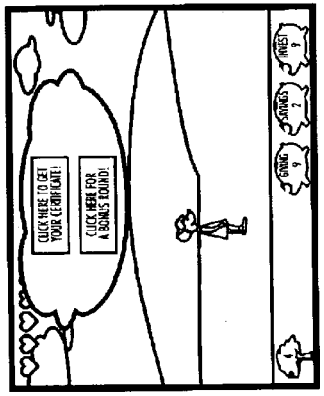
Figure 7V:
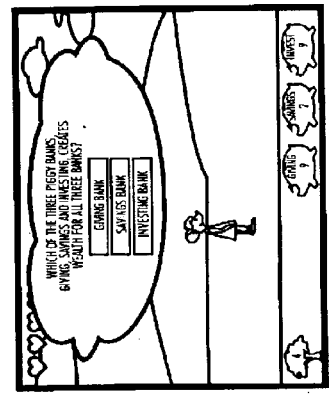
Figure 7W:
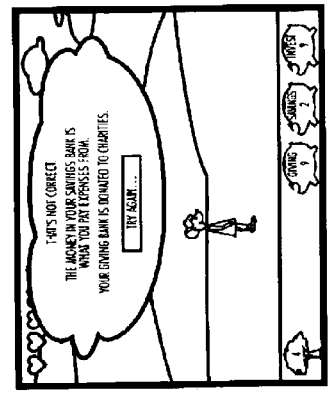
Figure 7X:
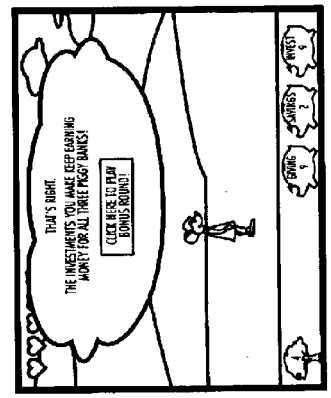
Figure 7Z:
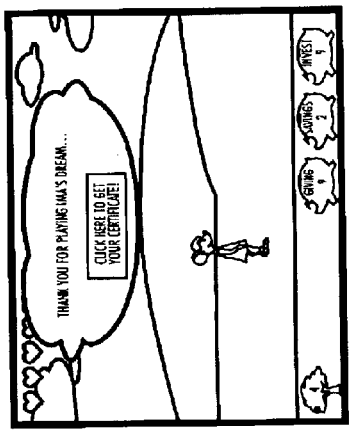
Figure 7Y:
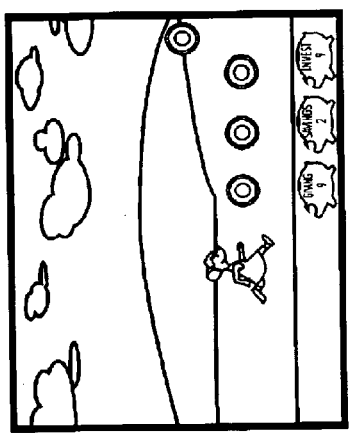

After the encounter with an icon (a hit) is resolved, it is determined if the game is complete (action 918). The game could end in one of many ways including based on time, reaching a scoring goal, collecting all available icons or some other criteria. FIG. 7T is an exemplary finish screen. A player can also be presented with choice to play again or a bonus, such as a printable certificate of completion as seen in FIG. 7U. Bonus questions can be provided after the game to reinforce the learning component of the game. In FIG. 7V, a bonus question is displayed. The question can be a multiple choice question such as: "Which of the three piggy banks, Giving, Savings, and Investment, creates wealth for all three banks?" with the answer choices of: a) the giving piggy bank, b) the savings piggy bank, or c) the investment piggy bank. If the player chooses the wrong answer, the game informs the player of the wrong answer and explains why the answer is wrong. It also offers an opportunity to try again. An exemplary screen depicting the wrong answer can be seen in FIG. 7W. If the player gets the correct answer, the game tells the player that as seen in FIG. 7X. FIG. 7Y depicts the playing of a bonus round. In a bonus round, the play is more difficult. Following a bonus round the player may be offered an incentive such as printing out a certificate of completion as seen in FIG. 7Z.

In the preferred examples of the interactive games described above, the game sequencing, audio and video animation, and scene depictions, as with all the interactive games described herein, may be implemented using an objected oriented programming language called Action Script in connection with a multimedia product known as FLASH Version 5 (or later) available from Macromedia, Inc. 600 Townsend Street, San Francisco Calif. 94103 (macromedia.com). However, any programming language that could facilitate the functionality and features of the interactive games described herein, for example, JAVA, C++, Visual Basic, and/or Fortran, among others, could also be used.

Profit Income, Asset Income and Financial Freedom

Figure 14:
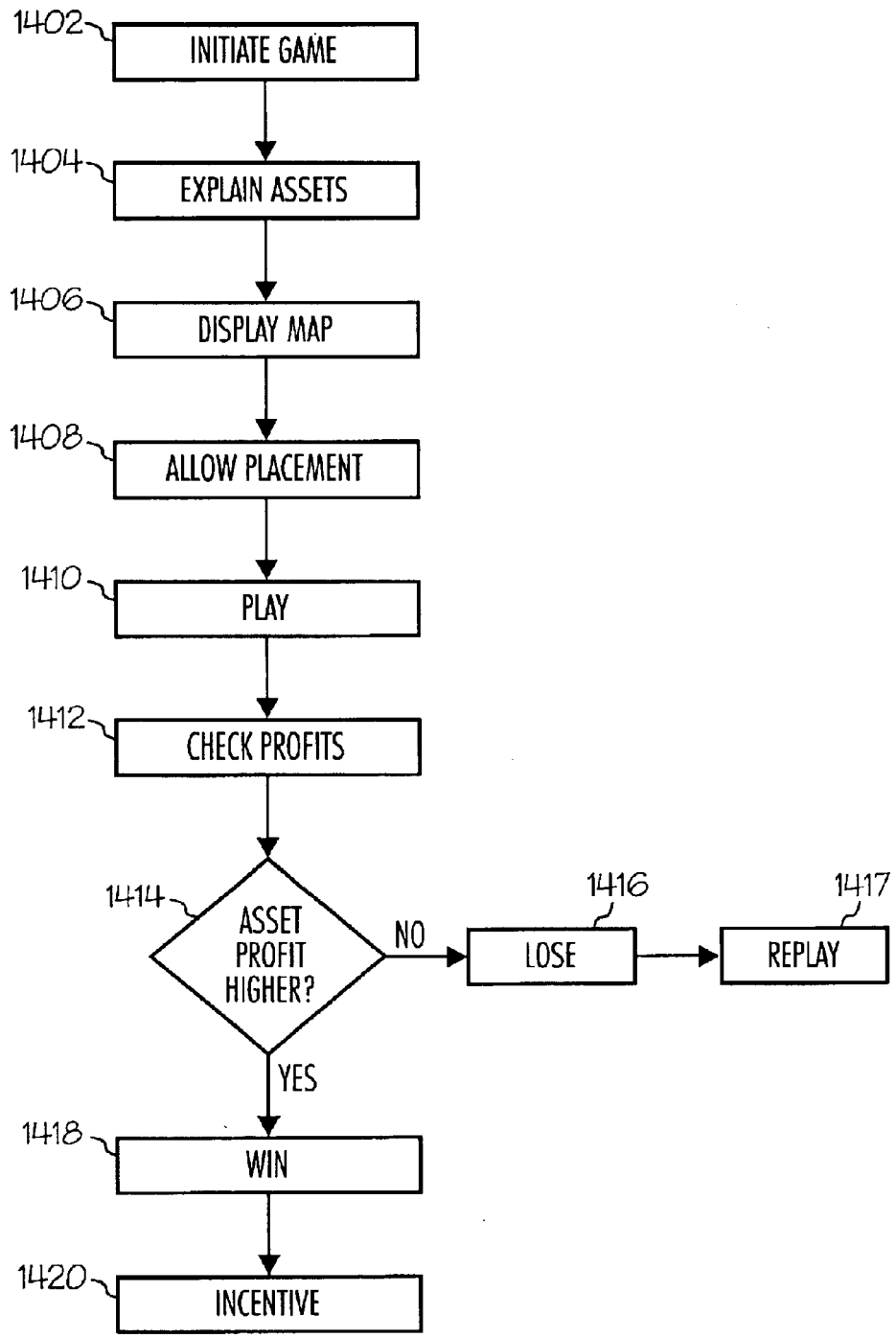
FIG. 14 is a flowchart of the game depicted in FIGS. 10A–10L.

In yet another exemplary example of the invention, a financial interactive game that teaches players about the differences between earned income and asset income is provided. As used herein "earned income " is income derived from wages paid for work. Asset income is income derived from investments. Any suitable game for teaching the difference between earned income and asset income may be used. Referring to FIGS. 10A–10L, an example interactive game referred to as "Jesse's Big Change" emphasizes and reinforces the differences between profit income, like that derived in the previously described example interactive game entitled "Jesse's Ice Cream Stand," and asset income asset income, like that derived from the gumball machine in the previously described example interactive game entitled "Reno's Debt Dilemma." In one embodiment, the player can move an asset around a map to see where it produces the most income. This helps to each the player in a hands-on way the importance of location in maximizing an assets potential. At different levels a different number of potential locations may be provided. Also, in embodiments for older children, the player may have to analyze or calculate the return on investment (ROI). Animation and interactivity of the game helps to further reinforce learning. FIG. 14 is a flowchart outlining the play of the game.

The story line of this example embodiment preferably begins with animated characters, Jesse and Toki, discussing how much work it can be to make a profit, such as by selling ice cream (action 1402). In FIG. 10A, Jesse laments the fact that he is working so very hard and Toki explains that Jesse needs to get asset income to get on the fast track. Toki then discusses and explains what an asset is and how assets work for you in FIG. 10B. Toki explains to Jesse that he could take a break from the hard work if he had enough income assets (action 1404). The interactive player is asked to help Jesse place a given number of income assets around the town so that Jesse can make more money from his assets ("asset income") than he makes selling ice cream at a profit ("profit income") as seen in FIG. 10C. To facilitate this, a map 1002 of Jesse's town is illustrated as seen in FIG. 10D (action 1406). Also shown is a graphical representation of Jesse's profit income 1004 from ice cream sale and Jesse's asset income 1006 from the sale of the assets that will be set up. The three assets 1008, 1010, and 1012 that will be placed around town are also illustrated. When viewing this screen, Toki's voice tells the player that by dragging one of the assets 1008, 1010 and 1012 to various locations on the map, the value of the assets will change. The income for each asset varies at different positions in the town. In the exemplary embodiment, the player drags Jesse's assets, one by one, around a symbolic map of the town while the screen indicates to the player, the potential income of the asset at its current position. The asset income preferably varies between positions and may take into consideration, location of business, schools, traffic, number of people and other types of factors reflected in the map of the town. FIG. 10E shows how one of the assets 1012 has been placed on a location on the map (action 1408). The value 1014 of the asset at that location is given.

Figure 10G:
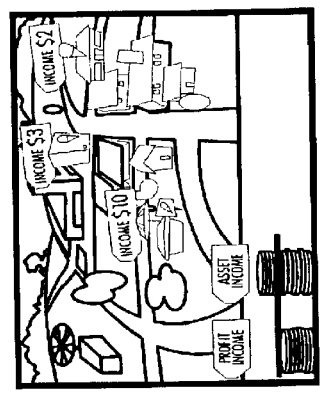
Figure 10J:
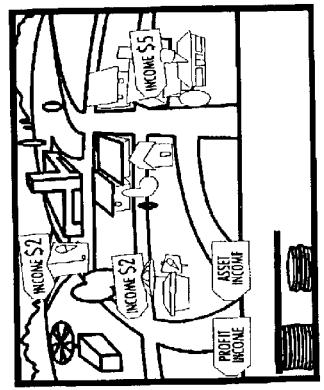
Figure 10H:
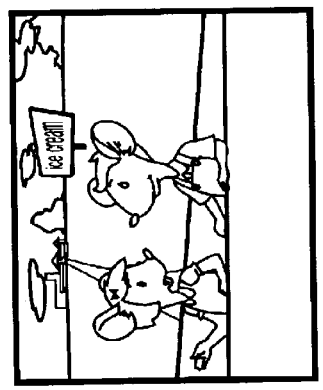
Figure 10K:
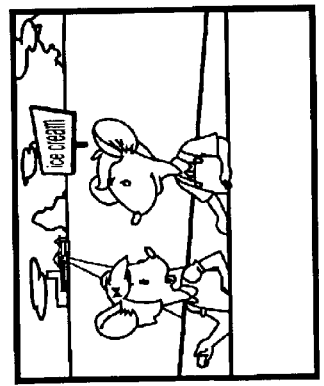
Figure 10I:
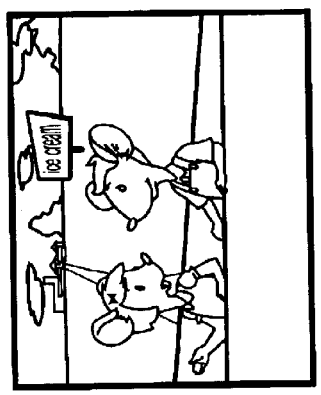
Figure 10L:
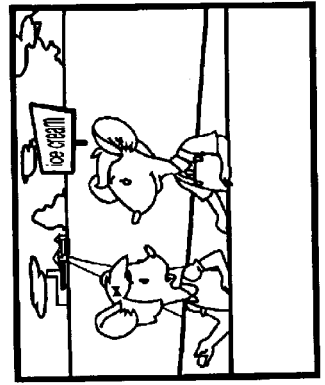

When the player locates what they believe is the position with maximum income for the asset, the player places the asset in that location, for example, by dropping it from drag mode. This process is repeated until all of Jesse's assets have been placed in the town. When the player chooses the final location, the profit income is decreased (since it cost money to buy the asset that was placed there). Once all three assets are placed, play begins (action 1410). The profit from the ice cream stand is seen flying into and increasing the profit income 1004. The money from the placed assets is seen flying into and increasing the asset income pile 1006. This can be seen in FIG. 10F. At the end of the game the profit income 1004 and the asset income 1006 are checked to see which one is bigger (1412). FIG. 10G illustrates the scenario where asset income exceeds profit income (actions 1414 and 1416). When this occurs Jesse is congratulated as seen in FIGS. 10H and 10I (action 1418). If Jesse has made more asset income than profit income, Jesse is preferably rewarded in a manner similar to other games and embodiments discussed herein, e.g., certificate of achievement or play of otherwise inaccessible game (action 1420). Reinforcement of the financial principles emphasized in this game may also be included (although not shown). FIG. 10J shows the scenario where asset income is less than profit income (actions 1414 and 1416). In that case, it is explained that asset income is not high enough (as seen in FIG. 10K)(action 1416). Then a chance to replay is given in step 10L (action 1417).

Rewards, Incentives & Bonuses for Playing

As described previously successful completion of each game (e.g., action 140 of FIG. 1), is preferably accompanied by one or more rewards, bonuses and/or incentives (collectively and/or individually, a "reward"). Such a reward serves the purpose of helping to acknowledge the player's hard work or effort to successfully complete each interactive game and/or providing incentive to the player to continue to work hard and pay attention in future games, and any suitable reward may be provided.

In one embodiment of the invention the reward comprises a certificate of achievement for completing the game. Turning to FIG. 11, an example certificate of achievement 1100, optionally but preferably, includes a reference 1110 to the financial principles learned by the player for the particular game and the name 1120 of the player to whom certificate 1100 is awarded. In preferred embodiments of the interactive games, the successful player is prompted to enter their name/names on the screen so that an electronic version of certificate 1100 can be composed using a stored template. Once certificate 1100 is composed, it is preferably displayed on a screen to the player in a manner that the player may print it out on a printing device and/or store it in a memory. In a preferred implementation, after the user has completed the game for a specific level, they are presented with the choice to have an award certificate presented to them that indicates their name, the game completed and the basic concepts (or financial principles) they have just learned. The user's name can be captured in the FLASH-based game, which in turn calls an HTML or XML page containing client-side JavaScript that renders the appropriate information into an existing template on that page. The user may then save and/or print certificate 1100 using normal web browser functions.

Alternatively or in addition to certificate 1100, the Reward may comprise giving the player access to an otherwise inaccessible game, e.g., the "Cheese Run" game previously mentioned. An example of such a game will now be described in reference to FIGS. 12A–12K. This type of bonus interactive game preferably does not include a lesson component like those previously discussed, but in an exemplary embodiment, the entertainment game may reinforce what was learned in previous games (FIGS. 12B–12E, 12G–12J).

In a preferred embodiment, the basic features of "Cheese Run" include a mouse character, a piece of cheese, a dynamic maze, and one or more villains. The basic premise of "Cheese Run" is to steer the mouse to the cheese while traversing various impediments to accomplish this. Preferably, the game also includes a timer to limit the time the player has to get the mouse to the cheese.

The dynamic maze is one impediment to the mouse reaching the cheese. In a preferred embodiment, the maze walls move during game play so that the player has a challenge getting the mouse to the cheese. There are several manners in which the maze walls may move. For example, in one implementation, the game starts without any maze walls between the mouse and the cheese and the maze pieces fall into place in substantially sequential manner at random locations on the screen. The result is the mouse may have to change directions several times before he finds the right path. In this embodiment, the maze walls may also inadvertently fall on top of the mouse as it moves if the player controlling the mouse movements is not careful. In this case, the mouse may be set back to its original starting position and game play continues as the maze continues to develop.

Additionally and/or alternatively, the formed maze walls may randomly change positions from one location to another during game play, thereby potentially changing the path available for the mouse to reach the cheese. In this case it may be possible for the mouse to get trapped in one maze path and have to wait until another maze wall moves to enable escape. However, preferably, the randomization of maze wall building and falling allows at least one path for the mouse to reach the cheese.

Another impediment to the mouse reaching the cheese may include one or more villains or bad characters/symbols, e.g., doodads, floating in various directions around the maze. These villains may move randomly, be attracted by the mouse, and/or may or may not be required to move within the formed maze walls. When the mouse inadvertently touches the villain, the mouse is preferably sent back to its starting position while play continues, e.g., the timer counts down. When the timer expires, play ends. To play again, the player is required to have another token, credit or other awarded merit to play again. The player may be awarded a bonus play by answering reinforcement questions as discussed herein. Other variations to this game are possible without departing from scope of the game play, such as changes in moving characters, objects to be retrieved and additional impediments to reaching the object.

Figure 12A:
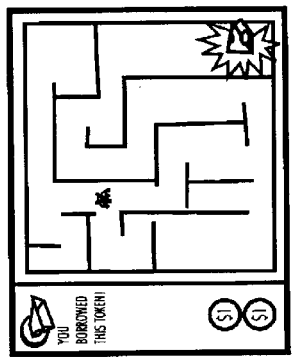
Figure 12D:
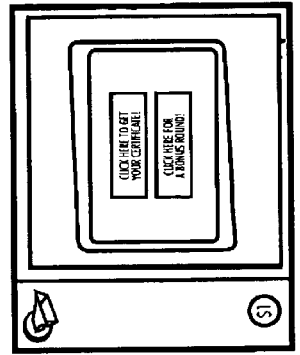
Figure 12B:
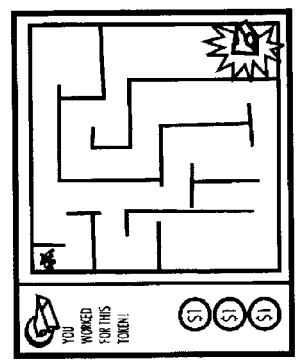
Figure 12E:
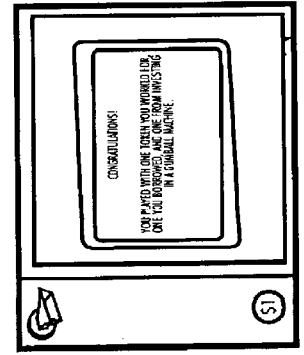
Figure 12C:
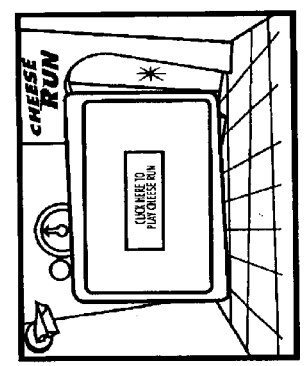
Figure 12F:
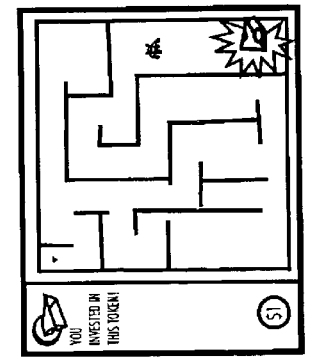

An exemplary playing of the "Cheese Run" shown in FIGS. 12A–12K. FIG. 12A illustrates an exemplary start screen. At this screen the announcer announces, "Have fun playing 'Cheese Run'!" Reno replies, "Cool!" In FIG. 12B the first turn starts. The game, either with a text box or using the announcer, notes that the first token used was earned with work. The player plays the game as discussed previously. FIG. 12C illustrates the start of the turn using the borrowed token. A message appears stating that the token was paid for by working of a loan. FIG. 12D illustrates the start of the turn where the token earned from investing is used. Prior to playing a statement is made that the token being used was earned through investment. In FIG. 12E, after all the tokens are used another reinforcement screen is displayed that recaps the fact that one token was earned through work, one token was earned via paying back a loan and the third token was earned from an investment. Then, the player is given the opportunity to print out a certificate of completion or to try to play a bonus round. This is displayed in FIG. 12F. If the option to play a bonus round is chosen, a trivia question might be given first. FIG. 12G illustrates a screen asking an exemplary trivia question. In this case the question is "Which of the three ways to pay earns tokens for you while you were playing "Cheese Run"? A) Work to play; B) Borrow to play or C) Invest to play." If the wrong answer is chosen, then a corrective screen can be displayed explaining the wrong answer is displayed, as seen in FIG. 12H. If the correct answer is given the player is congratulated, as seen in FIG. 12I. FIG. 12J illustrates the playing of the bonus round and FIG. 12K shows the offering of a certificate to a player after the successful completion of the bonus round.

Figure 13A:
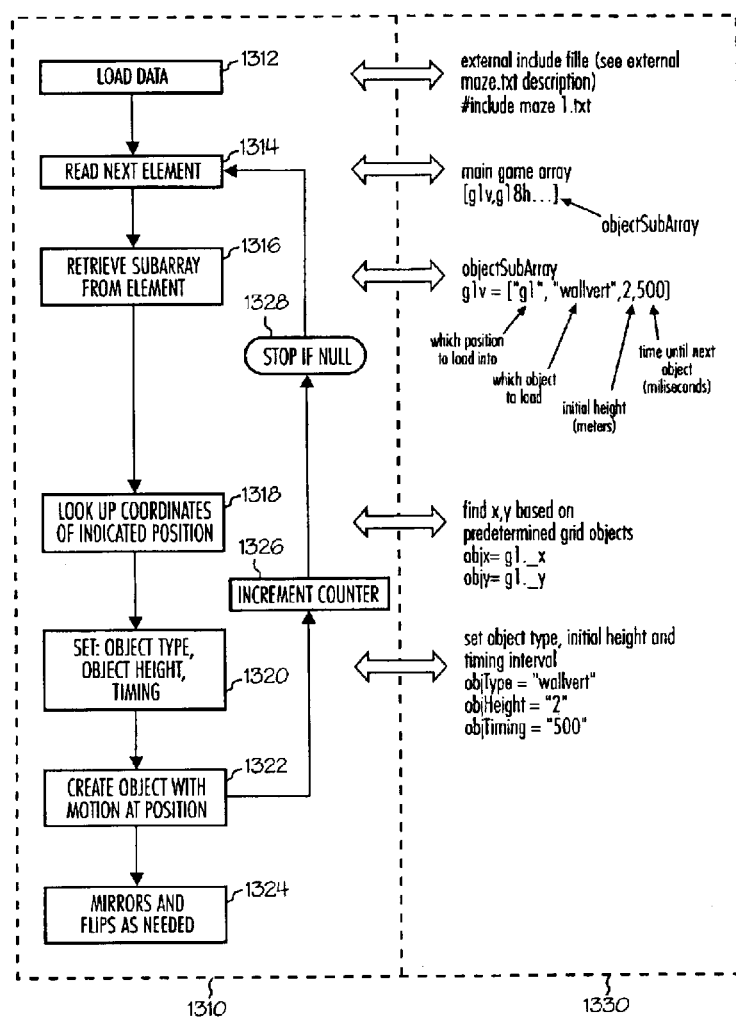

Turning to FIGS. 13A–13C, an example implementation of dynamically building and falling maze walls will now be described. When the player is placed in the maze that builds around the player during game play, a main game play array controls the order in which objects (walls) are loaded into each position. Each position is a sub-array, which describes the object (e.g., size and/or type of wall) to be loaded into that position. The position of each maze wall is based on a predetermined grid coordinate system, e.g., an 8×8 grid layout. A basic macroflow process 1310 and corresponding generic code nomenclature 1330 for creating the dynamic movement selection of maze walls is represented in FIG. 13A. Essentially, the process begins by calling data files 1330 (FIG. 13B) that define the pieces and positions of the dynamic maze elements. The maze is composed by positioning horizontal and vertical wall elements 1340, 1345, specified by the data files 1330, in quadrants 1350–1354 (FIG. 13C) of the predefined grid. The elements are mirrored and/or flipped, after perspective scaling, depending on the quadrant to which they are placed. First, the data for the maze is loaded (action 1312). This includes the main game array 1342 as seen in FIG. 13B. The main game array 1342 includes multiple elements 1344, each element 1344 representing a wall segment. Each element is associated with a subarray 1346 that contains information concerning the location, orientation, height and speed of motion for the wall segment represented by the element. The elements of the main game array are indexed and read individually, the current element read based on a counter value (action 1314). After the first element is read, the subarray 1346 corresponding to that element is retrieved (action 1316). Then, the location of where the wall segment represented by the element is determined based on a predefined grid (action 1318). The object type, height and timing for the wall segment represented by the element is determined from the subarray 1346 (action 1320). Using the above information, the wall segment is animate as falling to the predetermined location (action 1322). If necessary, the wall segment is flipped or mirrored to maintain perspective (action 1324). The counter is incremented so the next element 1344 can be read (1326). If the last element has been read, the process stops (action 1328)

Additional types of incentives and/or rewards may be provided to a player for successfully completing a game including, for example, credits to purchase items or game play, points that count toward the award of a bonus prize, gift certificates and other monetary mediums, and/or graduation for the player to higher level of education or game play.

Unless contrary to physical possibility, the inventor envisions: (i) the methods and systems described herein may be performed in any sequence and/or combination; and (ii) the components or items of respective embodiments may be combined in any manner.

Although there have been described preferred embodiments of this novel invention, many variations and modifications are possible and the embodiments described herein are not limited by the specific disclosure above, but rather should be limited only by the scope of the appended claims and legal equivalents thereof.

What is claimed is:

1. A system for teaching financial principles, the system comprising:

a server computer operative to be accessed by one or more client terminals over a communications network; and software stored on a tangible medium in communication with the server computer, the software including machine readable code that when executed by a processor is configured for:

providing output to a user of the one or more client terminals via the communications network, wherein the output comprises video data representations of one or more animated characters conveying one or more financial lessons; and receiving input from the user via the one or more client terminals and communications network, the input comprising user response information relating to the one or more financial lessons;

wherein the user response information comprises user actions to assist the one or more animated characters to accomplish a financial goal;

wherein the financial goal comprises earning a greatest profit from a sale of an item; and wherein the provided output to the user further comprises video data representations of an interactive evaluation tool for the user actions to assist the one or more animated characters to earn the greatest profit.

2. The system of claim 1 wherein the machine readable code, when executed by the processor is further configured for:

processing the received input and updating the output to the user based on the processed received input.

3. The system of claim 2 wherein the communications network comprises an Internet.

4. The system of claim 2 wherein the updated output comprises information for reinforcing the one or more financial lessons.

5. The system of claim 2 wherein the updated output comprises accuracy information confirming the accuracy of the user response information.

6. The system of claim 5 wherein the updated output further comprises recognition information recognizing a user's efforts in responding.

7. The system of claim 6 wherein the recognition information comprises indicia of an achievement award.

8. The system of claim 1 wherein the one or more financial principles pertain to at least one financial principle selected from the group consisting of: debts, return on investment, earned income, charity, profit, elasticity of price and demand, and asset income.

9. The system of claim 1 wherein the financial goal comprises obtaining money for playing a game.

10. The system of claim 1 wherein the financial goal comprises giving to charity.

11. The system of claim 1 wherein the financial goal comprises generating a greatest asset income.

12. The system of claim 1 wherein the interactive evaluation tool assists the user in determining an elasticity of price and demand for the item.

13. The system of claim 1 wherein the provided output to the user further comprises video data representations for user selection of one from a plurality of available financial games.

14. The system of claim 1 wherein the provided output to the user further comprises video data representations for user selection of a complexity of the one or more financial lessons.

15. A method of hosting a system for teaching financial principles comprising:

facilitating access by one or more client terminals to a server computer over a communications network, wherein the server computer includes access to software stored on a tangible medium, the software including machine readable code that when executed by a processor is configured for:

(i) providing output to a user of the one or more client terminals via the communications network, wherein the output comprises video data representations of one or more animated characters conveying one or more financial lessons; and (ii) receiving input from the user via the one or more client terminals and communications network, the input comprising user response information relating to the one or more financial lessons facilitating communication of the output to the one or more client terminals; and facilitating communication of the user response information to the server computer;

wherein the one or more financial lessons comprises a profit lesson wherein the user assists the one or more animated characters to earn the greatest profit from a sale of a product.

16. The method of claim 15 wherein the one or more financial lessons comprises an investment lesson wherein the user interacts with the software to obtain money by working, borrowing or investing.

17. The method of claim 15 wherein the one or more financial lessons comprises a charity lesson wherein the user interacts with the software to set aside money in three separate accounts comprising a savings account, an expenses account and a charity account.

18. The method of claim 15 wherein the one or more financial lessons comprises an asset income lesson wherein the user interacts with the software to place investments assets in locations on a displayed map to generate asset income.

19. The method of claim 15 wherein the one or more financial lessons are presented to the user in a game context and wherein the one or more lessons comprise a profit lesson, an investment lesson, a charity lesson and an asset income lesson.

20. A computer program product comprising machine-readable code stored on a tangible medium, the machine readable code comprising:

code for communicating with a client terminal over a communications network;

code for outputting video display information to the client terminal, the video display information comprising graphics data representations of one or more characters animated to convey one or more financial principles;

code for processing response information received from the client terminal via the communications network; and code for updating video display information according to the received response information;

wherein the video display information further includes graphics data for visually representing a tool for a user to use in determining a demand at a specified price of an item.

21. The computer program product of claim 20 wherein the video display information further comprises graphics data prompting a user to select one from a plurality of available games for teaching financial principles.

22. The computer program product of claim 20 wherein the video display information further comprises graphics data prompting a user to select one from a plurality of available levels of complexity of the one or more financial principles.

23. The computer program product of claim 20 wherein the output video display information comprises data for visually and audibly representing:

a first animated character to explain the one or more financial principles to a user; and a second animated character for which the user is prompted to assist reach a financial goal.

24. The computer program product of claim 23 wherein the financial goal comprises earning a greatest profit from a sale of an item.

25. The computer program product of claim 23 wherein the financial goal comprises obtaining money in various ways.

26. The computer program product of claim 25 wherein obtaining money in various ways comprises working for money, borrowing money, and investing in assets for money.

27. The computer program product of claim 23 wherein the financial goal comprises giving to charity.

28. The computer program product of claim 23 wherein the financial goal comprises generating income by positioning an income asset in a desirable location on a user displayed map.

29. The computer program product of claim 20 wherein the video display information further comprises data for visually and audibly representing a user controlled character navigating through a side scrolling background to collect desirable items and avoid undesirable items.

30. The computer program product of claim 29 wherein the desired items comprise money, income assets and goodwill, and wherein the undesirable items comprise expenses.

31. The computer program product of claim 30 wherein the money, income assets and goodwill are respectively represented by tokens, money trees and hearts, and wherein expenses are represented by falling doodads.

32. The computer program product of claim 20 wherein the code for updating video display information according to the received response information comprises code for outputting updated video display information informing a user whether the received response information is accurate.

33. The computer program product of claim 32 wherein the updated video display information comprises audio data and graphics data.

34. The computer program product of claim 20 wherein the updated video display information comprises at least one of a first message confirming an accuracy of the response information, and a second message reinforcing the one or more conveyed financial principles.

35. The computer program product of claim 20 further comprising: code for rewarding a user for providing accurate received response information.

36. The computer program product of claim 20 further comprising:
    code for a recreational game; and
    code for not otherwise allowing the client terminal to access the recreational game without a user first accurately completing lessons associated with the one or more conveyed financial principles.

37. A method of hosting a system for teaching financial principles comprising:
    facilitating access by one or more client terminals to a server computer over a communications network, wherein the server computer includes access to software stored on a tangible medium, the software including machine readable code that when executed by a processor is configured for:
      (i) providing output to a user of the one or more client terminals via the communications network, wherein the output comprises video data representations of one or more animated characters conveying one or more financial lessons; and
      (ii) receiving input from the user via the one or more client terminals and communications network, the input comprising user response information relating to the one or more financial lessons
    facilitating communication of the output to the one or more client terminals; and
    facilitating communication of the user response information to the server computer;
    wherein the one or more financial lessons comprises a charity lesson wherein the user interacts with the software to set aside money in three separate accounts comprising a savings account, an expenses account and a charity account.

38. The method of claim 37 wherein the one or more financial lessons comprises an investment lesson wherein the user interacts with the software to obtain money by working, borrowing or investing.

39. The method of claim 37 wherein the one or more financial lessons comprises an asset income lesson wherein the user interacts with the software to place investments assets in locations on a displayed map to generate asset income.

40. The method of claim 37 wherein the one or more financial lessons are presented to the user in a game context and wherein the one or more lessons comprise a profit lesson, an investment lesson, a charity lesson and an asset income lesson.

41. A method of hosting a system for teaching financial principles comprising:
    facilitating access by one or more client terminals to a server computer over a communications network, wherein the server computer includes access to software stored on a tangible medium, the software including machine readable code that when executed by a processor is configured for:
      (i) providing output to a user of the one or more client terminals via the communications network, wherein the output comprises video data representations of one or more animated characters conveying one or more financial lessons; and
      (ii) receiving input from the user via the one or more client terminals and communications network, the input comprising user response information relating to the one or more financial lessons
    facilitating communication of the output to the one or more client terminals; and
    facilitating communication of the user response information to the server computer;
    wherein the one or more financial lessons comprises an asset income lesson wherein the user interacts with the software to place investments assets in locations on a displayed map to generate asset income.

42. The method of claim 41 wherein the one or more financial lessons comprises an investment lesson wherein the user interacts with the software to obtain money by working, borrowing or investing.

43. The method of claim 41 wherein the one or more financial lessons are presented to the user in a game context and wherein the one or more lessons comprise a profit lesson, an investment lesson, a charity lesson and an asset income lesson.

44. A computer program product comprising machine-readable code stored on a tangible medium, the machine readable code comprising:
    code for communicating with a client terminal over a communications network;
    code for outputting video display information to the client terminal, the video display information comprising graphics data representations of one or more characters animated to convey one or more financial principles;
    code for processing response information received from the client terminal via the communications network; and
    code for updating video display information according to the received response information;
    wherein the output video display information comprises data for visually and audibly representing:

a first animated character to explain the one or more financial principles to a user; and a second animated character for which the user is prompted to assist reach a financial goal; and wherein the financial goal comprises generating income by positioning an income asset in a desirable location on a user displayed map.

45. A computer program product comprising machine-readable code stored on a tangible medium, the machine readable code comprising:

code for communicating with a client terminal over a communications network;

code for outputting video display information to the client terminal, the video display information comprising graphics data representations of one or more characters animated to convey one or more financial principles;

code for processing response information received from the client terminal via the communications network; and code for updating video display information according to the received response information;

wherein the video display information further comprises data for visually and audibly representing a user controlled character navigating through a side scrolling background to collect desirable items and avoid undesirable items.

46. The computer program product of claim 45 wherein the desired items comprise money, income assets and goodwill, and wherein the undesirable items comprise expenses.

47. The computer program product of claim 46 wherein the money, income assets and goodwill are respectively represented by tokens, money trees and hearts, and wherein expenses are represented by falling doodads.

* * * * *